US008436084B2

United States Patent
Kawaguchi et al.

(10) Patent No.: US 8,436,084 B2
(45) Date of Patent: May 7, 2013

(54) AQUEOUS COATING COMPOSITION AND METHOD FOR FORMING MULTILAYER COATING FILM

(75) Inventors: Yohichi Kawaguchi, Hiratsuka (JP); Keiji Sugamoto, Hiratsuka (JP); Kazuaki Kitazono, Hiratsuka (JP); Takato Adachi, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 237 days.

(21) Appl. No.: 13/054,226

(22) PCT Filed: Jun. 25, 2009

(86) PCT No.: PCT/JP2009/062073
§ 371 (c)(1),
(2), (4) Date: Jan. 14, 2011

(87) PCT Pub. No.: WO2010/007891
PCT Pub. Date: Jan. 21, 2010

(65) Prior Publication Data
US 2011/0117378 A1      May 19, 2011

(30) Foreign Application Priority Data

Jul. 16, 2008  (JP) ................................. 2008-184388
Jul. 16, 2008  (JP) ................................. 2008-184450

(51) Int. Cl.
*C08K 5/05*       (2006.01)
(52) U.S. Cl.
USPC ............ 524/379; 524/385; 524/539; 525/437
(58) Field of Classification Search .................. 524/379, 524/385, 539; 525/437
See application file for complete search history.

(56) References Cited

U.S. PATENT DOCUMENTS

| | | | | |
|---|---|---|---|---|
| 5,280,062 A | * | 1/1994 | Blum et al. ................... | 524/591 |
| 5,525,670 A | | 6/1996 | Nishi et al. | |
| 5,569,707 A | * | 10/1996 | Blum et al. ................... | 524/591 |
| 2007/0237903 A1 | * | 10/2007 | Hiwara et al. ............. | 427/407.1 |
| 2009/0280256 A1 | * | 11/2009 | Narita et al. ............... | 427/372.2 |

FOREIGN PATENT DOCUMENTS

| | | |
|---|---|---|
| JP | 2-147238 | 6/1990 |
| JP | 8-012925 | 1/1996 |
| JP | 8-209059 | 8/1996 |

OTHER PUBLICATIONS

International Search Report issued Oct. 20, 2009 in International (PCT) Application No. PCT/JP2009/062073.
Written Opinion of the International Searching Authority issued Oct. 20, 2009 in International (PCT) Application No. PCT/JP2009/062073.

* cited by examiner

*Primary Examiner* — Ling Choi
*Assistant Examiner* — Wenwen Cai
(74) *Attorney, Agent, or Firm* — Wenderoth, Lind & Ponack, L.L.P.

(57) ABSTRACT

An object of the present invention is to provide an aqueous coating composition capable of forming a coating film having a superior finishing appearance. The present invention provides an aqueous coating composition comprising a polyester resin containing a predetermined or greater amount of long chain, straight-chain dicarboxylic acid and/or straight-chain diols having a predetermined or greater carbon number and having hydroxy groups and acid values within predetermined ranges; a urethane-associated thickener having a hydrophobic group and/or a polyacrylicacid-based thickener having a hydrophobic group; a curing agent; and a hydrophobic solvent, wherein the contents of the thickener and the hydrophobic solvent are within a specific range based on the gross amount of the polyester resin and the curing agent. The present invention also provides a method for forming a multilayer coating film using the aqueous coating composition.

11 Claims, No Drawings

AQUEOUS COATING COMPOSITION AND METHOD FOR FORMING MULTILAYER COATING FILM

TECHNICAL FIELD

The present invention relates to an aqueous coating composition and a method for forming a multilayer coating film ensuring a superior finishing appearance such as excellent smoothness etc.

BACKGROUND ART

In recent years, environmental concerns have become global issues. The auto industry has taken a proactive stance to facilitate environmental reform in the automobile production processes.

Automobile production can be the cause of various environmental problems including global warming, industrial waste, output of volatile organic compounds (VOC) etc. Particularly, since VOC output is mostly caused by car painting processes, there is a demand for an immediate solution.

To prevent corrosion and for aesthetic purposes, the exterior panels of car bodies are generally coated with a multilayer coating film consisting of a base coating film formed of a cationic electrodeposition coating composition, an intercoating film, and a top-coating film. To reduce VOC, intercoating compositions and top-coating compositions are more often made of aqueous compositions these days.

Superior finishing appearance and film performance are indispensable, particularly for coating films of automobiles. However, since the existing aqueous coating compositions are used with water as the solvent, the finishing appearance of the resulting coating film is generally unsatisfactory, compared with those formed of solvent-type coating compositions.

For example, Patent Document 1 discloses an aqueous coating composition mainly containing a specific acrylic resin and/or polyester resin, specific polycarbonate resin, and a curing agent. This aqueous coating composition, however, cannot assure a satisfactory finishing appearance. Patent Document 2 discloses an aqueous coating composition mainly containing a specific acrylic resin and/or polyester resin, a specific polycarbonate resin, a curing agent, specific resin granules. This aqueous coating composition is also conducive to a poor finishing appearance of the resulting coating film in some cases, such as poor smoothness etc.

CITATION LIST

Patent Literature

Patent Document 1: Japanese Unexamined Patent Publication No. H08-12925
Patent Document 2: Japanese Unexamined Patent Publication No. H08-209059

SUMMARY OF THE INVENTION

Technical Problem

An object of the present invention is to provide an aqueous coating composition capable of forming a coating film having a superior finishing appearance, such as desirable smoothness etc.

Solution to Problem

The inventors of the present invention particularly focused on the relationship between a polyester resin and a thickener. As a result of extensive study, the inventors found a novel aqueous coating composition which does not cause the aforementioned problems. The aqueous coating composition comprises a polyester resin containing a predetermined or greater amount of long chain, straight-chain dicarboxylic acid and/or straight-chain diols having a predetermined or greater carbon number and having hydroxy groups and acid values within predetermined ranges; a urethane-associated thickener having a hydrophobic group and/or a (meth) acrylic acid copolymer-based thickener having a hydrophobic group; a curing agent; and a hydrophobic solvent, wherein the contents of the thickener and the hydrophobic solvent are within a specific range based on the gross amount of the polyester resin and the curing agent. Based on this discovery, the inventors completed the present invention.

Specifically, the present invention provides the following items.

Item 1. An aqueous coating composition containing a polyester resin (A), a curing agent (B), a thickener (C) and a C6-14 hydrophobic solvent (D),
wherein:
the polyester resin (A) is obtained by reaction of an acid component and an alcohol component;
the polyester resin (A) contains a straight-chain dicarboxylic acid (a-1) having a carbon number of 8 or more and a straight-chain diol (a-2) having a carbon number of 8 or more in an amount of 5 to 30 mass % in total, based on the gross amount of the acid component and the alcohol component used in the reaction;
the polyester resin (A) has a hydroxy group value of 100 to 200 mg KOH/g, and an acid value of 8 to 22 mg KOH/g;
the thickener (C) is a urethane-associated thickener containing a C8-36 hydrophobic group and/or a (meth) acrylate-copolymer-based thickener containing a C8-36 hydrophobic group; and
the aqueous coating composition contains the thickener (C) in an amount of 0.01 to 3 mass %, and the hydrophobic solvent (D) in an amount of 4 to 20 mass %, based on the gross amount of the polyester resin (A) and the curing agent (B).

Item 2. The aqueous coating composition according to Item 1, wherein the urethane-associated thickener containing a C8-36 hydrophobic group is a urethane-associated thickener represented by the following Formula (1),

[Chemical Formula 1]

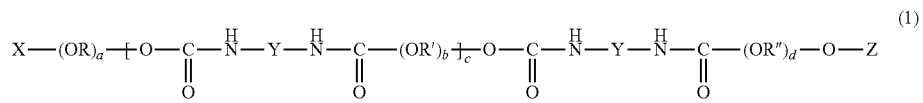

(1)

wherein X and Z, which are the same or different, are C8-36 hydrocarbon groups; Y is a bivalent organic residue derived from a diisocyanate compound; OR, OR' and OR", which are the same or different, are C2-4 oxyalkylene groups; a and d, which are the same or different, are integers from 0 to 50; b is an integer from 10 to 500; and c is 0 or an integer of not less than 1.

Item 3. The aqueous coating composition according to Item 1, wherein the (meth) acrylate-copolymer-based thickener containing a C8-36 hydrophobic group is obtained by copolymerizing a polymerizable unsaturated monomer mixture containing:

(c-1) (meth) acrylate or salt thereof;

(c-2) polymerizable unsaturated monomer represented by the Formula (2),

[Chemical Formula 2]

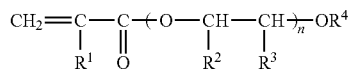

(2)

wherein R1 is a hydrogen atom or a methyl group; $R^2$ and $R^3$, which are the same or different, represent a hydrogen atom, a methyl or ethyl group; R4 is a C8-36 hydrocarbon group; and n is an integer from 3 to 60;

(c-3) alkyl (meth) acrylate having a C1-4 alkyl group; and (c-4) polymerizable unsaturated monomer having two or more polymerizable unsaturated groups in each molecule, and wherein the mixture contains (c-1) in an amount of 1 to 50 mass %; (c-2) in an amount of 5 to 60 mass %; (c-3) in an amount of 5 to 60 mass %; and (c-4) in an amount of 0.05 to 5 mass %, based on the total amount.

Item 4. The aqueous coating composition according to any one of Items 1 to 3 wherein the curing agent (B) contains a melamine resin completely or partially alkyl-etherified, and the mole ratio of the butoxy groups to the methoxy groups in the melamine resin is 20/80 to 50/50.

Item 5. A method for forming a multilayer coating film comprising sequentially applying an intercoating composition and a top-coating composition to a substrate, the method comprising the step of applying the aqueous coating composition according to any one of Items 1 to 4 as an intercoating composition.

Item 6. The method for forming a multilayer coating film according to Item 5, comprising the steps of (1) applying an intercoating composition (X) on a substrate to form a first colored coating film;

(2) applying a first top coating composition (Y) on the first colored coating film formed in the step (1) to form a second colored coating film;

(3) applying a second top coating composition (Z) on the second colored coating film formed in the step (2) to form a clear film; and (4) simultaneously drying the first colored coating film, the second colored coating film and the clear coating film formed in the steps (1) to (3) by baking.

Item 7. The method for forming a multilayer coating film according to Item 6, wherein the curing agent (B) contained in the intercoating composition (X) used in the step (1) comprises at least one member selected from the group consisting of isocyanate-group-containing compound (b-1), oxazoline-group-containing compound (b-2), carbodiimide group-containing compound (b-3), hydrazide group-containing compound (b-4) and semicarbazide-group containing compound (b-5).

Item 8. The method for forming a multilayer coating film according to Item 6 or 7, wherein the intercoating composition (X) is a coating composition which forms a coating film having a gel fraction of 15 to 95 mass % when the intercoating composition (X) is applied so that the film thickness becomes 30 μm after curing at 80° C. for ten minutes.

Item 9. An article to which the aqueous coating composition according to any one of Item s 1 to 4 is applied.

Item 10. An article having coating layers which are applied using the method for forming a multilayer coating film according to any one of Item s 5 to 8.

Advantageous Effects of the Invention

In the aqueous coating composition of the present invention, the polyester resin contains a straight-chain dicarboxylic acid having a carbon number of 8 or more and/or a straight-chain diol having a carbon number of 8 or more in a specific amount range; and the thickener contains a hydrophobic group.

In this composition, a hydrophobic interaction occurs between the hydrophobic group derived from straight-chain dicarboxylic acid having a carbon number of 8 or more and/or straight-chain diol having a carbon number of 8 or more in the polyester resin (A), the hydrophobic group in the thickener (C), and the hydrophobic solvent (D), thereby expressing optimal viscosity behavior and ensuring a superior coating film appearance. Accordingly, it becomes possible to obtain a coating composition capable of forming a coating film with superior finishing appearance such as excellent surface smoothness etc.

As described, the aqueous coating composition of the present invention provides an effect of providing an aqueous coating composition which ensures a superior finishing appearance such as a smooth coating surface etc.

DESCRIPTION OF EMBODIMENTS

Best Mode for Carrying Out the Invention

The following describes the aqueous coating composition of the present invention in detail.

The aqueous coating composition of the present invention (may also be referred to as a "present coating composition") contains a polyester resin (A), a curing agent (B), a thickener (C) and a hydrophobic solvent (D).

Polyester Resin (A)

The polyester resin (A) used for the aqueous coating composition of the present invention is obtained by the reaction of an acid component with an alcohol component. The reaction is performed using 5 to 30 mass %, preferably 7 to 25 mass %, more preferably 10 to 22 mass % of the straight-chain dicarboxylic acid having a carbon number of 8 or more (a-1) and the straight-chain diol having a carbon number of 8 or more (a-2), based on the gross amount of the acid component and the alcohol component. The hydroxy group value and the acid value of the polyester resin (A) are 100 to 200 mg KOH/g and 8 to 22 mg KOH/g, respectively.

In the specification of the present invention, the acid value (mgKOH/g) is obtained by a potassium-hydroxide-based conversion (mg) of the amount of the acid group per gram (solid content) of the sample. The molecular weight of the potassium hydroxide is 56.1.

In the specification of the present invention, the hydroxy group value (mgKOH/g) is obtained by potassium-hydroxide-based conversion (mg) of the amount of the hydroxy group per gram (solid content) of the sample. The molecular weight of the potassium hydroxide is 56.1.

In the present invention, the hydroxy group value and the acid value can be measured by the method disclosed in the Examples of the present invention.

Examples of the straight-chain aliphatic dicarboxylic acids having a carbon number of 8 or more (a-1) include octanedioic acids (suberic acid), nonanedioic acids (azelaic acid), decanedioic acids (sebacic acid), undecanedioic acids, dodecanedioic acids, brassylic acids, hexadecanedioic acids, and octadecanedioic acids. The carbon number of each straight-chain aliphatic dicarboxylic acid having a carbon number of 8 or more (a-1) is preferably 8 to 16, more preferably 8 to 12, in terms of desired coating composition viscosity and coating film properties to ensure both finish property and sag resistance. The straight-chain aliphatic dicarboxylic acid having a carbon number of 8 or more (a-1) may be used solely or in a combination of two or more kinds.

Examples of the straight-chain diol having a carbon number of 8 or more (a-2) include 1,8-octanediol, 1,9-nonanediol, 1,10-decanediol, 1,11-undecanediol and 1,12-dodecanediol. The carbon number of each straight-chain diol having a carbon number of 8 or more (a-2) is preferably 8 to 16, more preferably 8 to 12, in terms of desired coating composition viscosity and coating film properties to ensure both finish property and sag resistance. The straight-chain diol having a carbon number of 8 or more (a-2) may be used solely or in a combination of two or more kinds.

Examples of acid components other than the straight-chain aliphatic dicarboxylic acids having a carbon number of 8 or more (a-1) include, but are not limited to, aliphatic polycarboxylic acids (including acid anhydrides) such as succinic acids, glutaric acids, adipic acids, pimelic acids, citric acids, maleic acids, fumaric acids, itaconic acids, or anhydrides thereof; aromatic polycarboxylic acids (including acid anhydrides) such as phthalic acid, phthalic anhydride, isophthalic acid, terephthalic acid, trimellitic acid, trimellitic anhydride, pyromellitic acid, pyromellitic anhydride, or naphthalene dicarboxylic acid; alicyclic polycarboxylic acids (including acid anhydrides) i.e., compounds having one or more alicyclic structures (mostly 4 to 6 membered rings) and two or more carboxy groups in each molecule and acid anhydrides thereof such as 1,2-cyclohexane dicarboxylic acids, 1,2-cyclohexane dicarboxylic acid anhydrides, 1,3-cyclohexane dicarboxylic acids, 1,4-cyclohexane dicarboxylic acids, 4-cyclohexane-1,2-dicarboxylic acids, 4-cyclohexane-1,2-dicarboxylic acid anhydrides, 3-methyl-1,2-cyclohexane dicarboxylic acids, 3-methyl-1,2-cyclohexane dicarboxylic acid anhydrides, 4-methyl-1,2-cyclohexane dicarboxylic acids, 4-methyl-1,2-cyclohexane dicarboxylic acid anhydrides, 1,2,4-cyclohexane tricarboxylic acids, 1,2,4-cyclohexane tricarboxylic acid 1,2-anhydrides, or HET acid; fatty acids such as coconut oil fatty acids, cotton-seed-oil fatty acid, hempseed oil fatty acid, rice-bran-oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; benzoic acid, 4-tert-butyl benzoic acid and the like. The acid component other than the acid (a-1) may be used solely or in a combination of two or more kinds.

Examples of alcohol components other than the straight-chain diol having a carbon number of 8 or more (a-2) include, but are not limited to, dihydric alcohols such as ethylene glycols, propylene glycols, diethylene glycols, trimethylene glycols, triethylene glycols, dipropylene glycols, 1,4-butanediols, 1,3-butanediols, 2,3-butanediols, 1,2-butanediols, 3-methyl-1,2-butanediols, 2,2-diethyl-1,3-propane diols, 2-butyl-2-ethyl-1,3-propane diols, 1,2-pentanediols, 1,5-pentanediols, 1,4-pentanediols, 2,4-pentanediols, 2,3-dimethyltrimethylene glycols, tetra methyleneglycols, 3-methyl-4,3-pentanediol, 3-methyl-1,5-pentanediols, 2,2,4-trimethyl-1,3-pentanediols, 1,6-hexanediols, 1,5-hexanediols, 1,4-hexanediols, 2,5-hexanediols, neopentyl glycols, or neopentyl glycol hydroxypivalate; polylactone diols in which a caprolactone compound, such as $\epsilon$-caprolactone, is added to the dihydric alcohol; ester diol compounds such as bis(hydroxyethyl)terephthalate; alkylene oxide adducts of Bisphenol A; polyether diol compounds such as polyethylene glycols, polypropylene glycols, or polybutylene glycols; trihydric or higher hydric alcohols such as glycerin, trimethylolpropane, trimethylolethane, diglycerin, triglycerin, 1,2,6-hexanetriol, pentaerythritol, dipentaerythritol, sorbitol, or mannitol; polylactone polyol compounds in which a caprolactone compound, such as $\epsilon$-caprolactone, is added to a trihydric or higher hydric alcohol; alicyclic polyhydric alcohols such as 1,3-cyclohexane dimethanol, 1,4-cyclohexane dimethanol, tricyclodecanedimethanol, hydrogenated Bisphenol A, or hydrogenated Bisphenol F.

The alcohol component other than the diol (a-2) may be used solely or in a combination of two or more kinds.

Further, to improve water-dispersibility, it is possible to introduce a hydroxy acid having two or more hydroxy groups (a-3) as an alcohol component, in addition to the above alcohols.

Examples of hydroxy acids having two or more hydroxy groups (a-3) include 2,2-dimethylol propionic acid, 2,2-dimethylol butanoic acid, 2,2-dimethylol pentanoic acid, 2,2-dimethylol hexanoic acid, 2,2-dimethylol octanoic acid, 2,2-dimethylol butyric acid, 2,2-dimethylol valeric acid, and polyester polyol or polyether polyol obtained by condensing these acids.

In addition to the aforementioned acid and alcohol components, it is possible to react an acid with a mono-epoxy compound such as $\alpha$-olefin epoxide such as propylene oxide or butylene oxide, or Cardura E10 (product of HEXION Specialty Chemicals. Co. Ltd.: a glycidyl ester of synthesized hyperbranched saturated fatty acid), so as to introduce these compounds in the polyester.

The method for synthesizing polyester resin (A) is not limited and any known method can be used. For example, the synthesis can be carried out by heating the acid component and the alcohol component at 150 to 250° C. for 5 to 10 hours under a nitrogen stream, thereby causing esterification between the hydroxy group and the carboxy group.

In the esterification reaction, the acid component and the alcohol component may be added all at once or in several batches. Alternatively, a polyester resin containing a hydroxy group may be synthesized first, followed by a reaction between the resin and an acid anhydride, thereby causing half-esterification of the resin.

Additionally, to promote the esterification or ester exchange reaction, well-known catalysts, such as dibutyltin oxide, antimony trioxide, zinc acetate, manganese acetate, cobalt acetate, calcium acetate, lead acetate, tetrabutyl titanate, or tetra isopropyl titanate may be used.

The polyester resin (A) may be modified by fatty acids, mono-epoxy compounds, polyisocyanate compounds and the like during its preparation or after the esterification reaction.

Examples of the fatty acids include (semi) drying oil fatty acids such as linseed oil fatty acid, coconut oil fatty acid, safflower oil fatty acid, soybean oil fatty acid, sesame oil fatty acid, perilla oil fatty acid, hempseed oil fatty acid, tall oil fatty acid, and dehydrated castor oil fatty acid. Generally, the modification amounts of these fatty acids are preferably not more than 30 wt % in oil length. The polyester resin may be one in which a part of a monobasic acid, such as benzoic acid, is reacted.

Examples of the mono-epoxy compounds include α-olefin epoxide such as propylene oxide or butylene oxide, and the "Cardura E10" (product of HEXION Specialty Chemicals Co. Ltd.: glycidyl ester of a synthetic hyperbranched saturated fatty acid).

Examples of the polyisocyanate compounds include aliphatic diisocyanate compounds such as lysine diisocyanate, hexamethylene diisocyanate, or trimethyl hexane diisocyanate; cyclic aliphatic diisocyanate compounds such as hydrogenated xylylene diisocyanate, isophorone diisocyanate, methyl cyclohexane-2,4(or 2,6)-diisocyanate, 4,4'-methylene bis(cyclohexylisocyanate), or 1,3-(isocyanatomethyl)cyclohexane; aromatic diisocyanate compounds such as tolylene diisocyanate, xylylene diisocyanate, or diphenylmethane diisocyanate; organic polyisocyanates such as trihydric or higher hydric polyisocyanates including lysine triisocyanate, or adducts of these organic polyisocyanates and polyhydric alcohols, low-molecular weight polyester resins, water or the like; and cyclized polymers (e.g. isocyanurate) or biuret adducts of the aforementioned organic diisocyanates. They may be used solely or in a combination of two or more kinds.

The ratio of polyester resin containing a hydroxy group to the polyisocyanate compound in the reaction is not limited insofar as the hydroxy group value of the urethane modified polyester resin obtained by the reaction falls within 100 to 200 mg KOH/g, and the acid value falls within 8 to 22 mg KOH/g.

To ensure anti-chipping properties, water resistance, and top-coat adherence of the coating film to be formed, the hydroxy group value of the polyester resin (A) is preferably within 100 to 200 mg KOH/g, particularly within 130 to 180 mg KOH/g.

Further, to ensure the viscosity of the coating composition which is induced by interaction with the thickener containing a hydrophobic group, the acid value of the polyester resin (A) is preferably within 8 to 22 mg KOH/g, particularly 9 to 18 mgKOH/g.

Furthermore, to ensure the smoothness and film performance of the resulting coating film, the number-average molecular weight of the polyester resin (A) ranges from 300 to 50000, preferably 500 to 20000, more preferably 800 to 10000.

The number-average molecular weight and the weight-average molecular weight shown in this specification of the present invention are conversion values from a number-average molecular weight and a weight-average molecular weight measured by gel permeation chromatograph ("HLC8120GPC": product of Tosoh Corporation), based on the molecular weight of standard polystyrene. This measurement used four columns: "TSKgel G-4000HXL", "TSKgel G-3000HXL", "TSKgel G-2500HXL", and "TSKgel G-2000HXL" (all are products of Tosoh Corporation). The measurement was performed with a mobile phase tetrahydrofuran and a RI detector under 40° C. and flow rate of 1 mL/min.

To increase water-dispersibility, the polyester resin (A) is preferably neutralized by a neutralizer. This allows the polyester resin (A) to be mixed with water and to be dispersed in water more readily.

Examples of neutralizers include alkali metal hydroxides or alkaline earth metal hydroxides such as sodium hydroxide, potassium hydroxide, lithium hydroxide, calcium hydroxide, or barium hydroxide; ammonia; primary monoamine compounds such as ethylamine, propylamine, butylamine, cyclohexylamine, monoethanolamine, isopropanolamine, neopentanolamine, 2-aminopropanol, 3-aminopropanol, or 2-amino-2-methylpropanol; secondary monoamine compounds such as diethylamine, dibutylamine, diethanolamine, dipropylamine, diisopropanolamine, N-methylethanolamine, N-ethylethanolamine or N-methylisopropanolamine; tertiary monoamine compounds such as triethylamine, tributylamine, dimethylethanolamine, diethylethanolamine, methyldiethanolamine, dimethylaminoethanol, or tryethanolamine; polyamine compounds such as ethylenediamine, diethylenetriamine, hydroxyethylaminoethylamine, ethylaminoethylamine, or methylaminopropylamine; pyridine; and morpholine. Among them, primary monoamine compounds, secondary monoamine compounds, tertiary monoamine compounds, polyamine compounds are preferred.

Curing Agent (B)

The curing agent (B) contained in the aqueous coating composition of the present invention is not particularly limited and a wide range of curing agents suitable for aqueous coating compositions may be used.

Curing Agent (B-1)

In the first preferred embodiment, for example, the following melamine resin and blocked polyisocyanate compound are suitable. The curing agent may be one kind or a combination of two or more kinds.

Examples of melamine resins include methylol melamines such as dimethylol melamine, trimethylol melamine, tetramethylol melamine, pentamethylol melamine, or hexamethylol melamine; etherified alkyl of methylol melamine and alcohol; and etherified alcohol of methylol melamine condensate and alcohol. Examples of alcohols include methyl alcohol, ethyl alcohol, propyl alcohol, isopropyl alcohol, butyl alcohol, isobutyl alcohol, and 2-ethylhexyl alcohol.

The melamine resin may be a commercial item, such as "Cymel 303", "Cymel 323", "Cymel 325", "Cymel 327", "Cymel 350", "Cymel 370", "Cymel 380", "Cymel 385", "Cymel 212", "Cymel 253", "Cymel 254" (Japan Cytec Industries, Inc.); "Resimine 735", "Resimine 740", "Resimine 741", "Resimine 745", "Resimine 746", "Resimine 747" (Monsanto Japan limited); "Sumimal M55", "Sumimal M30W", "Sumimal M50W" (Sumitomo Chemical Co. Ltd.); or "U-Van 20SE" (Mitsui Chemicals, Inc.).

A suitable melamine resin is a methyl-butyl mixture etherified melamine resin, which is obtained by partially or entirely etherifying the methylol group of a partially or entirely methylolated melamine resin, using methyl alcohol and butyl alcohol.

For the methyl-butyl mixed etherified melamine resin, an alkyl etherified melamine resin in which the ratio of the butoxy group to the methoxy group is 20/80 to 50/50 mol %, preferably 30/70 to 45/55 mol %, is suitable in terms of the water resistance of the coating film and coating composition viscosity caused by the interaction with the thickener having a hydrophobic group.

When thus using a methyl-butyl mixture etherified melamine resin for the curing agent (B), the content of the methyl-butyl mixture etherified melamine resin in the curing agent (B) is 50 mass % or more.

Further, when using a melamine resin for the curing agent, a curing catalyst may be used. Examples of curing catalysts include sulfonic acids such as paratoluene sulfonic acid, dodecyl benzene sulfonic acid, or dinonylnaphthalene sulfonic acid; neutralized salts of the sulfonic acids and amines; and neutralized salts of phosphoric ester compounds and amines.

A blocked polyisocyanate compound is a compound having at least two isocyanate groups in each molecule wherein the isocyanate groups are blocked by a blocking agent.

Examples of polyisocyanate compounds in the blocked polyisocyanate compound include aliphatic polyisocyanate, alicyclic polyisocyanate, aromatic aliphatic polyisocyanate, aromatic polyisocyanate and derivatives of these polyisocyanates.

Examples of aliphatic polyisocyanates include aliphatic diisocyanates such as trimethylene diisocyanates, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethyl hexamethylene diisocyanate, or 2,6-diisocyanatomethyl caproate; and aliphatic triisocyanates such as lysine ester triisocyanate, 1,4,8-triisocyanato octane, 1,6,11-triisocyanato undecan, 1,8-diisocyanato-4-isocyanatomethyl octane, 1,3,6-triisocyanato hexane, or 2,5,7-trimethyl-1,8-diisocyanato-5-isocyanatomethyl octane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethyl cyclohexylisocyanate (trivial name: isophorone diisocyanate), 4,4'-methylene bis (cyclohexylisocyanate), methyl-2,4-cyclohexane diisocyanate, methyl-2,6-cyclohexane diisocyanate, 1,3- or 1,4-bis (isocyanatomethyl)cyclohexane (trivial name: hydrogenated xylylene diisocyanate) or mixture thereof, norbornane diisocyanate; and alicyclic triisocyanates such as 1,3,5-triisocyanato cyclohexane, 1,3,5-trimethyl isocyanato cyclohexane, 2-(3-isocyanato propyl)-2,5-di(isocyanatomethyl)-bicyclo(2.2.1) heptane, 2-(3-isocyanato propyl)-2,6-di(isocyanatomethyl)-bicyclo(2.2.1) heptane, 3-(3-isocyanato propyl)-2,5-di(isocyanatomethyl)-bicyclo(2.2.1) heptane, 5-(2-isocyanato ethyl)-2-isocyanatomethyl-3-(3-isocyanato propyl)-bicyclo(2.2.1) heptane, 6-(2-isocyanato ethyl)-2-isocyanatomethyl-3-(3-isocyanato propyl)-bicyclo(2.2.1) heptane, 5-(2-isocyanato ethyl)-2-isocyanatomethyl-2-(3-isocyanato propyl)-bicyclo(2.2.1)-heptane, or 6-(2-isocyanato ethyl)-2-isocyanatomethyl-2-(3-isocyanato propyl)-bicyclo (2.2.1) heptane.

Examples of aromatic aliphatic polyisocyanates include aromatic aliphatic diisocyanates such as 1,3- or 1,4-xylylene diisocyanate or a mixture thereof, ω,ω'-diisocyanato-1,4-diethylbenzene, 1,3- or 1,4-bis(1-isocyanato-1-methyl ethyl) benzene (trivial name: tetra methyl xylylene diisocyanate) or a mixture thereof; and aromatic aliphatic triisocyanates such as 1,3,5-triisocyanatomethyl benzene.

Examples of aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, 4,4'-diphenyl ether diisocyanate; aromatic triisocyanate such as triphenylmethane-4,4',4"-triisocyanate, 1,3,5-triisocyanate benzene, 2,4,6-triisocyanato toluene; and aromatic tetra isocyanate such as diphenyl methane-2,2',5,5'-tetra isocyanate.

Examples of polyisocyanate derivatives include dimer, trimer, biuret, allophanate, carbodiimide, uretdione, uretimine, isocyanate, oxadiazine trion, polymethylene polyphenyl polyisocyanate (crude MDI, polymeric MDI) of the aforementioned polyisocyanate compound, and crude TDI.

The blocking agent serves to block the free isocyanate groups. The isocyanate group of the blocked polyisocyanate compound is regenerated by heating at a temperature of, for example, 100° C. or higher, preferably 130° C. or higher, and thereby readily reacting with the hydroxy group.

Examples of blocking agents include phenol blocking agents such as phenol, cresol, xylenol, nitrophenol, ethyl phenol, hydroxy diphenyl, butyl phenol, isopropyl phenol, nonyl phenol, or octyl phenol, hydroxy methyl benzoate; lactam blocking agents such as ε-caprolactam, δ-valerolactam, γ-butyrolactam, or β-propiolactam; aliphatic alcohol blocking agents such as methanol, ethanol, propylalcohol, butyl alcohol, amylalcohol, or lauryl alcohol; ether blocking agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, or methoxy methanol; benzyl alcohol; glycolic acid; glycolic acid esters such as glycolic acid methyl, glycolic acid ethyl, or glycolic acid butyl; lactates such as lactic acid, methyl lactate, ethyl lactate, or butyl lactate; alcohol blocking agents such as methylol urea, methylol melamine, diacetone alcohol, 2-hydroxyethyl acrylate, or 2-hydroxyethyl methacrylate; oxime blocking agents such as formamideoxime, acetamideoxime, acetoxime, methylethylketoxime, diacetylmonoxime, benzophenone oxime, or cyclohexaneoxime; active methylene blocking agents such as malonic dimethyl, malonic diethyl, ethyl acetoacetate, methyl acetoacetate, or acetylacetone; mercaptan blocking agents such as butyl mercaptan, t-butyl mercaptan, hexylmercaptan, t-dodecyl mercaptan, 2-mercaptbenzothiazole, thiophenol, methylthiophenol, or ethylthiophenol; acid amide blocking agents such as acetanilide, acetanisidide, acetotoluide, acrylamide, methacrylamide, acetoamide, stearamide, or benzamide; imide blocking agents such as succinimide, phthalimide, or maleinimide; amine blocking agents such as diphenyl amine, phenylnaphthylamine, xylidine, N-phenylxylidine, carbazole, aniline, naphthylamine, butylamine, dibutyl amine, or butylphenyl amine; imidazole blocking agents such as imidazole, or 2-ethylimidazole; pyrazole blocking agents such as 3,5-dimethylpyrazole; urea blocking agents such as urea, thiourea, ethylene urea, ethylene thiourea, or diphenyl urea; carbamate ester blocking agents such as phenyl N-phenyl carbamate; imine blocking agents such as ethylene imine, or propylene imine; and sulfuric acid blocking agents such as sodium bisulfite, or potassium bisulfite.

Further, a hydroxy carboxylic acid having at least one hydroxyl group and at least one carboxy group in each molecule may be used as a part of the blocking agent. Examples of such a hydroxy carboxylic acid include a hydroxypivalic acid, and a dimethylol propionic acid.

The mono-blocked isocyanate compound blocked by the hydroxy carboxylic acid has a carboxy group derived from a hydroxy carboxylic acid. This compound has sufficient water-dispersibility that derives from the hydrophilicity of the carboxy group.

Further, water dispersibility may be given to the blocking agent by partially incorporating a polyethylene glycol having a hydroxy group in one end and a methoxy group in the other end, thereby introducing a nonionic hydrophilic group.

When using a blocked polyisocyanate compound as a curing agent, an organic tin compound may be used as a curing catalyst.

In the first embodiment, the aqueous coating composition of the present invention using the curing agent is not only superior in finishing appearance and film-coating properties, but also ensures great coating workability (foaming resistance, sag resistance).

Curing Agent (B-2)

In the second preferred embodiment of the present invention, at least one of a isocyanate-group-containing compound (b-1), an oxazoline-group-containing compound (b-2), a carbodiimide group-containing compound (b-3), a hydrazide group-containing compound (b-4) semicarbazide-group containing compound (b-5), a melamine resin (b-6), and a blocked polyisocyanate compound (b-7) may be used as a curing agent (B).

Among them, in view of the distinctness of the resulting coating film, at least one compound selected from the group consisting of the isocyanate-group-containing compound (b-1), the oxazoline-group-containing compound (b-2), the carbodiimide group-containing compound (b-3), the hydrazide group-containing compound (b-4) and the semicarbazide-group containing compound (b-5) may be preferably used as the curing agent (B). The isocyanate-group-containing compound (b-1) is most preferred.

The content of the curing agent (B) is preferably 1 to 60 mass %, preferably 10 to 50 mass %, more preferably 20 to 40 mass %, based on 100 parts by mass of the resin solid content of the aqueous first colored coating composition (X).

Generally, when a melamine resin is used as the curing agent (B), the polyester resin (A) preferably contains a hydroxy group, and it is particularly preferable that the hydroxy group value of the polyester resin (A) is 100 to 200 mg KOH/g, more preferably 130 to 180 mg KOH/g, further preferably 140 to 170 mg KOH/g.

For the melamine resin (b-6), a similar resin to the aforementioned melamine resin described in the section of "Curing agent (B-1)" may be used.

When an isocyanate-group-containing compound (b-1) is used as the curing agent (B), the polyester resin (A) preferably contains a hydroxy group, and it is particularly preferable that the hydroxy group value of the polyester resin (A) is 100 to 200 mg KOH/g, more preferably 130 to 180 mg KOH/g, further preferably 140 to 170 mg KOH/g. Further, it is preferable that the equivalent ratio (NCO/OH) of the isocyanate group of the isocyanate-group-containing compound (b-1) to the hydroxy group of the polyester resin (A) is 0.5 to 2.0, preferably 0.8 to 1.5.

The isocyanate-group-containing compound (b-1) is a compound having at least two isocyanate groups in each molecule. Examples of isocyanate-group-containing compound (b-1) include aliphatic polyisocyanate, alicyclic polyisocyanate, aromatic aliphatic polyisocyanate, aromatic polyisocyanate, and the derivatives of these polyisocyanates.

Examples of the aliphatic polyisocyanates include aliphatic diisocyanates such as trimethylene diisocyanate, tetra methylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethyl hexamethylene diisocyanate, or 2,6-diisocyanatomethyl caproate; and aliphatic triisocyanate such as lysine ester triisocyanate, 1,4,8-triisocyanato octane, 1,6,11-triisocyanato undecan, 1,8-diisocyanato-4-isocyanatomethyl octane, 1,3,6-triisocyanato hexane, or 2,5,7-trimethyl-1,8-diisocyanato-5-isocyanatomethyl octane.

Examples of the alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethyl cyclohexylisocyanate (trivial name: isophorone diisocyanate), methyl-2,4-cyclohexane diisocyanate, methyl-2,6-cyclohexane diisocyanate, 1,3- or 1,4-bis (isocyanatomethyl)cyclohexane (trivial name: hydrogenated xylylene diisocyanate) and a mixture thereof, or norbornane diisocyanate; and alicyclic triisocyanates such as 1,3,5-triisocyanato cyclohexane, 1,3,5-trimethyl isocyanato cyclohexane, 2-(3-isocyanato propyl)-2,5-di(isocyanatomethyl)-bicyclo(2.2.1) heptane, 2-(3-isocyanato propyl)-2,6-di(isocyanatomethyl)-bicyclo(2.2.1) heptane, 3-(3-isocyanato propyl)-2,5-di(isocyanatomethyl)-bicyclo(2.2.1) heptane, 5-(2-isocyanato ethyl)-2-isocyanatomethyl-3-(3-isocyanato propyl)-bicyclo(2.2.1) heptane, 6-(2-isocyanato ethyl)-2-isocyanatomethyl-3-(3-isocyanato propyl)-bicyclo(2.2.1) heptane, 5-(2-isocyanato ethyl)-2-isocyanatomethyl-2-(3-isocyanato propyl)-bicyclo(2.2.1)-heptane, and 6-(2-isocyanato ethyl)-2-isocyanatomethyl-2-(3-isocyanato propyl)-bicyclo(2.2.1) heptane.

Examples of the aromatic aliphatic polyisocyanate include aromatic aliphatic diisocyanates such as 1,3- or 1,4-xylylene diisocyanate and a mixture thereof, ω,ω'-diisocyanato-1,4-diethylbenzene, 1,3- or 1,4-bis(1-isocyanato-1-methyl ethyl) benzene (trivial name: tetra methyl xylylene diisocyanate) and a mixture thereof; and aromatic aliphatic triisocyanates such as 1,3,5-triisocyanatomethyl benzene.

Examples of the aromatic polyisocyanates include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate and a mixture thereof, 2,4- or 2,6-tolylene diisocyanate and a mixture thereof, 4,4'-toluidine diisocyanate, and 4,4'-diphenyl ether diisocyanate; aromatic triisocyanates such as triphenylmethane-4,4',4"-triisocyanate, 1,3,5-triisocyanate benzene, 2,4,6-triisocyanato toluene; and aromatic tetra isocyanates such as 4,4'-diphenyl methane-2,2',5,5'-tetra isocyanate.

Examples of the derivatives of the polyisocyanate include dimer, trimer, biuret, allophanate, uretdione, uretimine, isocyanate, oxadiazine trion, polymethylene polyphenyl polyisocyanate (crude MDI, polymeric MDI) and crude TDI and the like of polyisocyanate compounds.

Each of the polyisocyanate and the derivative thereof may be used solely or in a combination of two or more kinds. Further, among these polyisocyanates, aliphatic diisocyanate, alicyclic diisocyanate and the derivatives thereof may be suitably used solely or in a combination of two or more kinds.

For the isocyanate-group-containing compound (b-1) of the present invention, a hydrophilic polyisocyanate compound (b-1'), which is obtained by modifying a polyisocyanate compound to have a hydrophilic property, is particularly preferred in terms of the smoothness of the resulting coating film.

Examples of the hydrophilic polyisocyanate compound (b-1') include anionic hydrophilic polyisocyanate compounds (b-1'-1); and nonionic hydrophilic polyisocyanate compounds (b-1'-2). The anionic hydrophilic polyisocyanate compound (b-1'-1) is obtained from an active-hydrogen-group-containing compound having an anionic group by reacting the active hydrogen group with the isocyanate group of the polyisocyanate compound. The nonionic hydrophilic polyisocyanate compounds (b-1'-2) are obtained by reacting hydrophilic polyether alcohol such as mono-alcohol of polyoxyethylene with the polyisocyanate compound. These compounds may be given water dispersibility using an emulsifier.

The active-hydrogen-group-containing compound having an anionic group is a compound having anionic groups such as carboxy groups, sulfonic acid groups, phosphate groups, betaine-structure-containing groups such as sulfobetaine, and also active hydrogen groups such as a hydroxy group or an amino group reactive to isocyanate groups. By reacting the compound and a polyisocyanate compound, the polyisocyanate compound becomes hydrophilic.

Examples of the active-hydrogen-group-containing compounds having such anionic groups include, but are not limited to, compounds having an anionic group and two or more active-hydrogen groups. For example, as the active-hydrogen-group-containing compounds having a carboxy group, dihydroxyl carboxylic acids such as 2,2-dimethylol acetic acid, 2,2-dimethylol lactate, 2,2-dimethylol propionic acid, 2,2-dimethylol butanoic acid, dimethylol heptanoic acid, dimethylol nonoic acid, 2,2-dimethylol butyrate, or 2,2-dimethylol valeric acid; diaminocarboxylic acids such as 1-carboxy-1,5-pentylenediamine, dihydroxy benzoic acid, 3,5-diamino benzoic acid, lysine, or arginine; or half-ester compounds of polyoxypropylene triol and maleic anhydride or phthalic anhydride may be used.

Examples of the activity hydroxy-containing compounds having a sulfonic acid group include N,N-bis(2-hydroxyethyl)-2-aminoethane sulfonic acid, 1,3-phenylenediamine-4,6-disulfonic acid, diaminobutane sulfonic acid, 3,6-diamino-2-toluene sulfonic acid, 2,4-diamino-5-toluene sulfonic acid, 2-(cyclohexyl amino)-ethane sulfonic acid, and 3-(cyclohexyl amino)-propane sulfonic acid.

Examples of the active-hydrogen-group-containing compounds having a phosphate group include 2,3-dihydroxy propyl phenylphosphate.

Examples of the active-hydrogen-group-containing compounds having a betaine-structure-containing group include sulfobetaine-group-containing compounds obtained by, for example, reacting tertiary amines, such as N-methyl diethanolamine, with 1,3-propane sultone.

Further, these active-hydrogen-group-containing compounds having an anionic group may be modified into an alkylene oxide modified product by adding an alkylene oxide such as ethylene oxide or propylene oxide thereto.

These active-hydrogen-group-containing compounds having an anionic group may be used solely or in a combination of two or more kinds.

Both nonionic and anionic emulsifiers are useful as the emulsifier for making the isocyanate compound water-dispersible. As a nonionic emulsifier, polyethylene oxide is suitable. As an anionic emulsifier, salts of sulfonic acid or phosphoric acid, or a mixture of them are suitable.

The same polyisocyanate compounds as those mentioned above may be used herein. However, among them, hexamethylene diisocyanate (HMDI), derivatives of hexamethylene diisocyanate (HMDI), isophorone diisocyanate (IPDI), and derivatives of isophorone diisocyanate (IPDI) are particularly preferred.

As the blocked polyisocyanate curing agent (b-7), aliphatic polyisocyanate, alicyclic polyisocyanate, aromatic aliphatic polyisocyanate, aromatic polyisocyanate, and blocked derivatives thereof may be used.

The same blocking agents as those mentioned in the section of "Curing agent (B-1)" may be used herein.

When using a blocked polyisocyanate compound as the curing agent, an organic tin compound may be used as a curing catalyst.

Preferable examples of the oxazoline-group-containing compounds (b-2) include polymeric compounds (b-2-1) having at least two oxazoline groups in the side-chain, and a monomeric compound (b-2-2) having at least two oxazoline groups in each molecule. Here, the oxazoline group is a group represented by the following Formula.

[Chemical Formula 3]

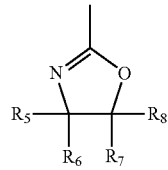

wherein, R5, R6, R7 and R8 are independent from each other and each represent a hydrogen atom or a C1-20 alkyl group.

The polymeric compounds (b-2-1) having at least two oxazoline groups in the side-chain may be obtained by polymerizing a polymerization unsaturated monomer (b-2-1a) having one or more oxazoline group, as necessary, with other unsaturated monomers (b-2-1b).

The monomer (b-2-1a) is a compound having one or more oxazoline groups and one or more polymerization unsaturated bonds in each molecule, such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline or the like.

The monomer (b-2-1b) is a compound other than the monomer (b-2-1a), having one or more polymerizable unsaturated bonds in each molecule. Examples of the monomer (b-2-1b) include C1-24 alkyl or cycloalkylester of (meth) acrylates such as methyl (meth) acrylate, ethyl(meth) acrylate, propyl (meth) acrylate, butyl (meth) acrylate, 2-ethylhexyl (meth) acrylate, cyclohexyl (meth) acrylate, lauryl (meth) acrylate, or isobornyl (meth) acrylate; C2-8 hydroxy alkyl ester of (meth) acrylates such as 2-hydroxyethyl (meth) acrylates or hydroxy propyl (meth) acrylates; vinyl aromatic compounds such as styrene or vinyl toluene; (meth)acrylamide, dimethylaminopropyl (meth) acrylamide, dimethylaminoethyl (meth) acrylate, adduct of glycidyl (meth) acrylate and amine compounds; polyethylene glycol (meth) acrylate; N-vinyl pyrrolidone; ethylene; butadiene; chloroprene; propionic acid vinyl; vinyl acetate; and (meth) acrylonitrile.

These compounds may be used solely or in a combination of two or more kinds. In the present invention, the phrase "(meth) acrylate" after each compound name denotes an acrylate or methacrylate".

The radical polymerization initiator for copolymerizing the unsaturated monomer may be realized by conventional compounds. The examples of the initiator include peroxides such as benzoyl peroxide, di t-butyl hydroperoxide, t-butyl hydroperoxide, cumyl peroxide, cumene hydroperoxide, diisopropylbenzenehydroperoxide, t-butylperoxy benzoate, lauryl peroxide, acetyl peroxide, or t-butylperoxy-2-ethylhexanoate; and azo compounds such as α,α'-azobis isobutyronitrile, α,α'-azobis-2-methyl butyronitrile, azobis dimethylvaleronitrile, or azobis cyclohexane carbonitrile.

The polymerization may be performed by a conventional method, such as, solution polymerization, emulsion polymerization or the like.

The content of the monomer (b-2-1a) in the polymeric compound (b-2-1) is preferably 1 to 100 mass %, more preferably 10 to 60 mass %, further preferably 20 to 50 mass %, based on the gross mass including the monomer (b-2-1b). Further, an appropriate number-average molecular weight of the polymeric compound (b-2-1) is 500 to 100,000, preferably 1,000 to 50,000, more preferably 3,000 to 30,000. The polymerization of the monomer (b-2-1a) and the monomer (b-2-1b) may be performed by a general method such as solution polymerization or the like. The resulting polymeric compound (b-2-1) is either water-soluble or water-dispersible.

Examples of the monomeric compound (b-2-2) include 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetra methylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinyl cyclohexane) sulfide, and bis-(2-oxazolinyl norbornane) sulfide. These compounds may be used solely or in a combination of two or more kinds.

The polymeric compound (b-2-1) having two or more oxazoline groups in the side-chains and the monomeric compound (b-2-2) having two or more oxazoline groups in each molecule may be used together.

In the present invention, to ensure low-temperature curing, the content of the oxazoline group in the oxazoline-group-containing compound (b-2) is preferably 0.2 to 1.0 mol, more preferably 0.5 to 1.0 mol per mol of the carboxy group in the polyester resin (A).

The carbodiimide-group-containing resin (b-3) can be obtained by reacting the isocyanate groups in the polyisocyanate compound with each other to remove carbon dioxide. Also, commercial items, such as "Carbodilite V-02", "Carbodilite V-02-L2", "Carbodilite V-04", "Carbodilite E-01", "Carbodilite E-02" (all are products of Nisshinbo) may be used as the carbodiimide-group-containing resin (b-3).

When using the oxazoline-group-containing compound (b-2) or the carbodiimide group-containing compound (b-3) as the curing agent (B), the polyester resin (A) generally contains a carboxy group. The acid value of the polyester resin (A) derived from the carboxy group is preferably 5 to 80, more preferably 10 to 70 mg KOH/g, further preferably 30 to 70 mg KOH/g.

The hydrazide group-containing compound (b-4) is a compound having at least two, preferably 2 to 10 hydrazide groups represented by —CO—NH—NH$_2$. Examples of the hydrazide group-containing compound (b-4) include C2-18 saturated dicarboxylic acid dihydrazides such as oxalic acid dihydrazide, malonic dihydrazide, glutaric acid dihydrazide, succinate dihydrazide, adipic acid dihydrazide, or sebacate dihydrazide; mono-olefin unsaturated dicarboxylic acid dihydrazides such as maleic acid dihydrazide, fumaric acid dihydrazide or itaconic acid dihydrazide; dihydrazide phthalates, terephthalate dihydrazides or isophthalic acid dihydrazides; pyromellitic acid dihydrazides, trihydrazides or tetrahydrazides; nitrilotrihydrazides, trihydrazide citrates, 1,2,4-benzenetrihydrazides, ethylene diamine tetra acetic acid tetrahydrazides, 1,4,5,8-naphthoic tetrahydrazides; polyhydrazides obtained by reacting an oligomer containing a carboxylic acid lower-alkyl ester group with hydrazine or hydrazine hydrate; and dihydrazide carbonates.

The semicarbazide-group containing compound (b-5) is a compound having at least two, preferably 2 to 10, semicarbazide groups represented by —NH—CO—NH—NH2 in each molecule. Examples of the semicarbazide-group containing compound (b-5) include bis semicarbazides; polyfunctional semicarbazides obtained by subjecting a diisocyanate such as hexamethylene diisocyanate or isophorone diisocyanate, or a polyisocyanate compound derived therefrom, to a reaction with excess N,N-substituted hydrazine such as N,N-dimethyl hydrazine or the aforementioned hydrazides; aqueous polyfunctional semicarbazides obtained by subjecting the isocyanate group in the product derived from the reaction between the polyisocyanate compound and the active hydrogen compound containing a hydrophilic group such as polyether, polyol compound, or polyethylene glycol mono-alkyl ether compound, to excess reaction with the aforementioned dihydrazides; compounds having a semicarbazide group such as a mixture of the polyfunctional semicarbazide and the aqueous polyfunctional semicarbazide; and compounds having a hydrazone group such as bis acetyldihydrazone.

When using the hydrazide group-containing compound (b-4) or semicarbazide-group containing compound (b-5) as the curing agent (B), the polyester resin (A) preferably contains a carbonyl group.

According to the second embodiment, the use of such a curing agent enables formation of a multilayer coating film excellent in smoothness, distinctness and in water resistance.

Specifically, the forming process is performed as follows.

Generally, application of a coating film on a car body is often performed in the method wherein, after subjecting the substrate to electrocoating, a multilayer coating film is formed by the 3-coat 2-bake (3C2B) method with the steps of applying an inter-coating composition→curing by baking→applying an aqueous base coating composition→preheating→applying a clear coating composition→curing by baking. Further, with recent energy saving promotions, the 3-coat 1-bake (3C1B) method (e.g. Japanese Unexamined Patent Publication No. 2002-282773), which omits the step of curing by baking after the application of inter-coating composition, has also been attempted. After subjecting the substrate to electrocoating, this 3C1B method is performed by the steps of applying an aqueous inter-coating composition→preheating→applying an aqueous base coating composition→preheating→applying a clear coating composition→curing by baking.

However, the 3C1B method more easily allows for the interfusion of the inter-coating layer with the base-coating layer, which often results in deterioration in the smoothness or distinctness of the resulting coating film, and a decrease in the anti-chipping properties of the coating film and/or a decrease in water resistance, which is assumed to derive from a change in the curing balance due to the shift of substances such as the curing agent between layers. Such defects of the 3C1B method have been considered a problem which needs to be solved.

In the second embodiment of the present invention, the use of the curing agent provides sufficient viscosity to the first colored coating film immediately before the application of the second colored coating composition, or develops a cross-linking reaction, thereby preventing interfusion of the first colored coating layer with the second colored coating layer. With this method, the resulting multilayer coating film has excellent smoothness, distinctness and water resistance.

Further, although a decrease in humidity generally increases the solid content of the applied composition, the viscosity of the applied composition does not excessively increase, thereby ensuring sufficient coating surface smoothness. With such an appropriate interaction, the method for forming a multilayer coating film of the present invention ensures a superior finishing appearance of a multilayer coating film.

Further, in the second embodiment, the aqueous first color coating composition (X) may contain a urethane modified polyester resin or the like in which a hydroxy group and a blocked isocyanate group coexist in a molecule as an auxiliary crosslinking agent of the curing agent (B).

The urethane modified polyester resin in which a hydroxy group and a blocked isocyanate group coexist in a molecule is a self-crosslinking resin, which can be synthesized by, for example, subjecting a part of the hydroxy group in the hydroxy-group-containing polyester resin to urethanization reaction with a partially-blocked polyisocyanate compound. The aforementioned examples for the blocked polyisocyanate compound (b-7) may be used as the polyisocyanate compound and the blocking agent.

When using the isocyanate-group-containing compound (b-1) as the curing agent (B), the curing agent preferably also contains a surfactant, more preferably an anionic surfactant and/or nonionic surfactant, further preferably an anionic surfactant.

Thickener (C)

The thickener (C) contained in the coating composition of the present invention is a urethane-associated thickener having a hydrophobic group and/or a (meth) acrylate-copolymer-based thickener having a hydrophobic group.

An example of the urethane-associated thickener is a compound having a urethane bond, a polyether chain, and a hydrophobic group in its terminus. The compound generally exhibits hydrophobic interactions in an aqueous medium, thereby exhibiting a thickening effect.

An example of the urethane-associated thickener having a hydrophobic group is the following compound represented by the Formula (1).

[Chemical Formula 4]

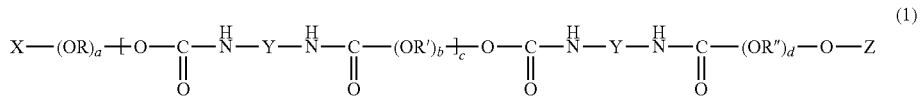

wherein X and Z, which are the same or different, are C8-36 hydrocarbon groups; Y is a bivalent organic residue derived from a diisocyanate compound; OR, OR' and OR", which are the same or different, are C2-4 oxyalkylene groups; a and d, which are the same or different, are integers from 0 to 50; b is an integer from 10 to 500; and c is 0 or an integer of not less than 1.

Examples of C8-36 hydrocarbon groups include straight-chain hydrocarbon groups such as n-octyl group, n-nonyl group, n-decyl group, n-undecyl group, n-dodecyl group, n-tridecyl group, n-tetra decyl group, n-penta decyl group, n-hexa decyl group, n-hepta decyl group, n-octa decyl group, n-nonadecyl, n-eicosyl group, n-heneicosyl group, or n-docosyl group; branched-chain hydrocarbon groups such as 2-ethylhexyl group, 2-butyl octyl group, 2-(3-methyl butyl)-1,6-dimethyl hexyl group, 2-pentyl nonyl group, 2-hexyldecyl group, 2-heptyl undecyl group, emery isostearyl group, 3-(1, 3,3-trimethyl butyl)-5,7,7-trimethyl octyl group, 2-octyl dodecyl group, 2-nonyl tridecyl group, cholesteryl group, lanosteryl group, agnosteryl group or lanoline group.

When the carbon number is less than 8, the thickening effect may become insufficient and compatibility with the substrate resin may decrease. Further, when the carbon number is more than 36, water-dispersibility decreases, which may deteriorate the finishing appearance or preservative properties of the coating film.

A hydrocarbon group with a carbon number of 18 or greater is particularly preferred. Among the straight-chain groups, an octa decyl group is particularly preferred. Among the branched-chain groups, a cholesteryl group or a lanosteryl group is particularly preferred.

In the Formula (1), Y is a bivalent organic residue based on a diisocyanate compound, in other words, Y corresponds to a group excluding two isocyanate groups from the diisocyanate compound. Examples of the diisocyanate compounds include, but are not limited to, aliphatic diisocyanate compounds, aromatic diisocyanate compounds, and alicyclic diisocyanate compounds.

Examples of the aliphatic diisocyanate compounds include methylene diisocyanates, dimethylene diisocyanates, trimethylene diisocyanates, tetra methylene diisocyanates, pentamethylene diisocyanates, hexamethylene diisocyanates, hepta methylene diisocyanates, octamethylene diisocyanates, nonamethylene diisocyanates, decamethylene diisocyanates, dipropyl ether diisocyanates, 2,2-dimethyl pentane diisocyanates, 3-methoxy hexane diisocyanates, 2,2,4-trimethylpentane diisocyanates, 3-butoxy hexane diisocyanates, 1,4-butylene glycol dipropyl ether diisocyanates, meta-xylylene diisocyanates, para-xylylene diisocyanates, and tetra methyl xylylene diisocyanates. Examples of the aromatic diisocyanate compounds include meta-phenylene diisocyanates, para-phenylene diisocyanates, 2,4-tolylene diisocyanates, 2,6-tolylene diisocyanates, dimethyl benzene diisocyanates, ethylbenzene diisocyanates, isopropylbenzene diisocyanates, biphenyl diisocyanates, tolidine diisocyanates, 3,3'-dimethoxy biphenyl diisocyanates, naphthalene diisocyanates, 4,4'-diphenylmethane diisocyanates, 2,2'-dimethyl diphenyl methane-4,4'-diisocyanates, 3,3'-dimethoxy diphenyl methane-4,4'-diisocyanates, 4,4'-dimethoxy diphenyl methane-3,3'-diisocyanates, 4,4'-diethoxy diphenyl methane-3,3'-diisocyanates and 2,2'-dimethyl-5,5'-dimethoxy diphenyl methane-4,4'-diisocyanates.

Examples of the alicyclic diisocyanate compound include cyclohexyl diisocyanates, hydrogenated xylylene diisocyanates, isophorone diisocyanates, and dicyclohexylmethane-4,4'-diisocyanates.

In the Formula (1), OR, OR' and OR", which are independent one another, are C2-4 oxyalkylene groups. When the carbon number of the oxyalkylene group is less than 2 or greater than 4, the viscosity of the thickener (C) may decrease. Examples of the C2-4 oxyalkylene groups include oxyethylene groups, oxypropylene groups, and oxybutylene groups. Among them, oxyethylenes are particularly preferable. The content of the oxyethylene group is generally at least 60 mass %, more preferably at least 80 mass %, more preferably at least 90 mass %, based on the gross of the oxyalkylene groups represented by OR, OR' and OR". When the content of the oxyethylene is 60 mass % or greater, high viscosity is ensured.

In the Formula (1), OR, OR' and OR" may be the same oxyalkylene groups or different oxyalkylene groups. Further, (OR)a, (OR')b and (OR")d may be compounds formed by an additive bond of at least two identical oxyalkylene groups, or compounds formed by a block or random bond of two or more oxyalkylene groups.

In the Formula (1), a and d each represent a number of repetitions of OR and OR", and each ranges from 0 to 50, preferably 0 to 30, more preferably 0 to 25. When a and d are greater than 50, the viscosity of the thickener (C) may decrease.

In the Formula (1), b represents a number of repetitions of OR', which ranges from 10 to 500, preferably 20 to 400, more preferably 30 to 300. When b is less than 10 or greater than 500, the viscosity of the thickener (C) may decreases.

In the Formula (1), c represents a number of repetitions in the following repeating unit.

[Chemical Formula 5]

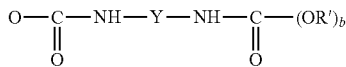

Also, c is 0 or an integer of not less than 1, preferably 1 to 500, and more preferably 20 to 400.

The compound represented by the Formula (1) can be synthesized using a known urethanization reaction. For example, the compound can be produced by reacting polyether monol, polyether diol and diisocyanate for 2 to 10 hours. The polyether monol, polyether diol and diisocyanate may be reacted by placing them together in a reaction vessel. It is also possible to react polyether diol with diisocyanate first, and then react the resulting product with polyether monol, or react polyether monol and diisocyanate first, and then react the resulting product with polyether diol. The reaction temperature is generally about 40 to 130° C., preferably about 70 to 100° C. The reaction may produce by-products. It is not necessary to remove the by-products. The compound represented by the Formula (1) can be used regardless of the presence of by products.

As necessary, the reaction may be performed in a solvent not containing an active hydrogen. Examples of the solvents include aromatic solvents such as toluene or xylene; aliphatic solvents such as petroleum ether or n-hexane; alicyclic solvents such as cyclohexane, cyclohexanone, or decalin; halogen-containing solvents such as chloroform, carbon tetrachloride, ethylene dichloride, or chlorbenzene; ester solvents such as ethyl acetate, butyl acetate, or pentyl acetate; ketone solvents such as methyl ethyl ketone, diethyl ketone, or methyl isobutyl ketone; and N-methylpyrrolidone.

Further, as necessary, the reaction may be performed in the presence of catalysts for urethanization reactions. Examples of the catalysts include amine compounds such as triethylamine, triethylene diamine, heptamethyldiethylene triamine, N-methylmorpholine, or benzyltriethyl ammonium hydroxide; metal-containing compounds such as stannous chloride, stannic chloride, tin octylate, lead octylate, dibutyltin dilaurate, cobalt naphthenate, lead naphthenate, potassium naphthenate, or antimony trichloride. The amount of the catalyst is generally 0.001 to 1 mass % based on the gross mass of the reaction materials. The catalyst is usually added once at the beginning of the reaction; however, the catalyst may be added in several lots during the reaction.

Examples of (meth) acrylate-copolymer-based thickeners include a polyacrylic acid salt, and polyacrylic acid-(meth) acrylic ester copolymer. The acid value of the (meth)acrylate-copolymer-based thickener is 30 to 300 mg/KOH, preferably 80 to 280 mg/KOH.

The following copolymer is preferably used as the (meth) acrylate-copolymer-based thickener.

A copolymer obtained by copolymerizing a polymerizable unsaturated monomer mixture containing:
(c-1) (meth) acrylate and salt thereof;
(c-2) polymerizable unsaturated monomer represented by the Formula (2),

[Chemical Formula 6]

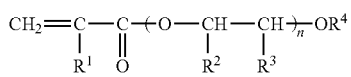

wherein R1 is a hydrogen atom or a methyl group; R2 and R3, which are the same or different, represent a hydrogen atom, a methyl or ethyl group; R4 is a C8-36 hydrocarbon group; and n is an integer from 3 to 60;
(c-3) alkyl(meth) acrylate having a C1-4 alkyl group; and
(c-4) polymerizable unsaturated monomer having two or more polymerizable unsaturated groups in each molecule.

The polymerizable unsaturated monomer mixture contains (c-1) in an amount of 1 to 50 mass %; (c-2) in an amount of 5 to 60 mass %; (c-3) in an amount of 5 to 60 mass %; and (c-4) in an amount of 0.05 to 5 mass %, based on the total amount.

(Meth) Acrylate (Salt) (c-1)

(meth) acrylate (salt) (c-1) is either an acrylic acid, a methacrylic acid, an acrylate or a methacrylate.

Examples of the salts include alkali metal salts such as sodium salts, potassium salts, or lithium salts; alkaline earth metal salts such as magnesium salts or calcium salts; ammonium salts; alkanolamine salts such as mono-ethanol amine salts, diethanolamine salts or triethanolamine salts; and C1-4 alkyl amine salts such as methyl amine salts, ethyl amine salts, propyl amine salts or butyl amine salts.

The (meth) acrylate (salt) is preferably acrylic acids, methacrylic acids, ammonium salts of methacrylic acid, or a tertially amine salt such as dimethylethanolamine salts or triethanolamine salts. Among them, acrylic acids and methacrylic acids are preferable. Methacrylic acids are particularly preferable.

• Polymerizable Unsaturated Monomer (c-2)

Polymerizable unsaturated monomers (c-2) are polymerizable unsaturated monomers represented by the following Formula (2):

[Chemical Formula 7]

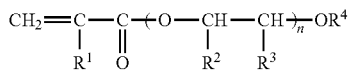

wherein $R^1$ represents a hydrogen atom or a methyl group, preferably a methyl group; $R^2$ and $R^3$ individually represent a hydrogen atom, a methyl group or an ethyl group; $R^4$ represents a C8-36 hydrocarbon group; n is an integer from 3 to 60; C represents a carbon atom; H represents a hydrogen atom; and O represents an oxygen atom.

Among them, $R^2$ and $R^3$ preferably individually represent a hydrogen atom and/or a methyl group to ensure the smoothness of the resulting coating film. Hydrogen atoms are particularly preferable.

$R^4$ is a C8-36 hydrocarbon group, more preferably a C12-32 alkyl or alkenyl group, such as a straight-chain alkyl group, a branched-chain alkyl group, a straight-chain alkenyl group, or a branched-chain alkenyl group.

Examples of the straight-chain alkyl groups include n-octyl group, n-nonyl group, n-decyl group, n-undecyl, n-dodecyl group, n-tridecyl group, n-tetra decyl group, n-penta decyl group, n-hexa decyl group, n-heptadecyl group, n-octa decyl group, n-nonadecyl, n-eicosyl group, n-heneicosyl group, and n-docosyl group. Examples of the branched-chain alkyl groups include 2-ethylhexyl group, isodecyl group, isotridecyl group, isostearyl group, 2-butyl octyl group, 2-(3-methy butyl)-1,6-dimethyl hexyl group, 2-pentyl nonyl group, 2-hexyldecyl group, 2-heptyl undecyl, 3-(1,3,3-trimethyl butyl)-5,7,7-trimethyl octyl group, 2-octyl dodecyl group, and 2-nonyl tridecyl group.

Examples of the straight-chain alkenyl groups include n-octenyl group, n-decenyl group, n-undecenyl group, n-dodecenyl group, n-tridecenyl group, n-tetra decenyl group, n-penta decenyl group, n-hexa decenyl group, n-hepta decenyl group and n-octadecenyl group. Examples of the branched-chain alkenyl groups include isooctenyl groups, isodecenyl groups, isoundecenyl groups, indodecenyl groups, isotridecenyl groups, isotetra decenyl groups, isopentadecenyl groups, isohexadecenyl groups, isohepta decenyl groups, and isooctadecenyl groups.

n is preferably an integer from 3 to 60. More preferably, n is an integer from 10 to 50, further preferably an integer from 20 to 40 to ensure preservative stability of the resulting coating composition.

Examples of the polymerizable unsaturated monomers (c-2) include (meth) acrylate to which 3 to 60 mols of n-docosanol ethylene oxide are added, (meth) acrylate to which 3 to 60 mols of n-heneicosanol ethylene oxide are added, (meth) acrylate to which 3 to 60 mols of n-eicosanol ethylene oxide are added, (meth) acrylate to which 3 to 60 mols of n-nonadecanol ethylene oxide are added, (meth) acrylate to which 3 to 60 mols of n-octadecanol ethylene oxide are added, (meth) acrylate to which 3 to 60 mols of n-heptadecanol ethylene oxide are added, and (meth) acrylate to which 3 to 60 mols of n-hexadecanol ethylene oxide are added.

Among them, (meth) acrylate to which 3 to 60 mols of n-docosanol ethylene oxide are added, (meth) acrylate to which 3 to 60 mols of n-octadecanol ethylene oxide are added, and (meth) acrylate to which 3 to 60 mols of n-hexadecanol ethylene oxide are added are preferable; further, (meth) acrylate to which 3 to 60 mols of n-docosanol ethylene oxide are added and (meth) acrylate to which 3 to 60 mols of n-octadecanol ethylene oxide are added are particularly preferable.

Alkyl (Meth) Acrylate Having a C1-4 Alkyl Group (c-3)

Examples of alkyl (meth) acrylate having a C1-4 alkyl group (c-3) include methyl (meth) acrylate, ethyl (meth) acrylate, n-propyl (meth) acrylate, iso-propyl(meth) acrylate, n-butyl (meth) acrylate, iso-butyl (meth) acrylate, and tert-butyl (meth) acrylate.

Among them, methyl (meth) acrylate, ethyl(meth) acrylate, n-propyl(meth) acrylate, n-butyl (meth) acrylate, particularly methyl (meth) acrylate, ethyl(meth) acrylate, n-propyl(meth) acrylate, are suitable in terms of the smoothness of the resulting coating film.

Polymerizable Unsaturated Monomer Having Two or More Polymerizable Unsaturated Groups in Each Molecule (c-4)

The polymerizable unsaturated monomer (c-4) may be any polymerizable unsaturated monomer insofar as it has two or more polymerizable unsaturated groups in each molecule and is polymerizable with (meth) acrylate (salt) (c-1), polymerizable unsaturated monomer (c-2) and alkyl(meth) acrylate (c-3). Examples of such polymerizable unsaturated monomers include double functional polymerizable unsaturated monomer (c-4-1) having two polymerizable unsaturated groups in each molecule, triple functional polymerizable unsaturated monomer (c-4-2) having three polymerizable unsaturated groups in each molecule, and 4 to 8 functional polymerizable unsaturated monomers (c-4-3) having 4 to 8 polymerizable unsaturated groups in each molecule.

Double Functional Polymerizable Unsaturated Monomer (c-4-1)

Examples of double functional polymerizable unsaturated monomer (c-4-1) include di(meth) acrylates of polyol and di(meth) acrylates of polyol to which alkylene oxide is added.

Examples of the polyol include ethylene glycol, propylene glycol, 1,2-butanediol, 1,4-butanediol, 2,3-butanediol, 1,6-hexanediol, 1,9-nonanediol, neopentyl glycol, 3-methyl-1,5-pentane diol, 2-butyl-2-ethyl-1,3-diol, tricyclodecane dimethylol, cyclo hexanediol, cyclohexane dimethylol, hydroquinone, bisphenol A, bisphenol F, hydrogenated bisphenol A, hydrogenated bisphenol F, pentaerythritol, trimethylolpropane and glycerin. Among them, 1,4-butanediol, 1,6-hexanediol, 1,9-nonanediol, neopentyl glycol, 3-methyl-1,5-pentandiol, 2-butyl-2-ethyl-1,3-diol, tricyclodecane dimethylol, cyclo hexanediol, cyclohexane dimethylol, hydrogenated bis phenol A, hydrogenated bis phenol F, pentaerythritol, trimethylolpropane, and glycerin are particularly suitable.

As the polyol alkylene oxide adduct, any polyol alkylene oxide adduct of the aforementioned polyols may be used. However, the number of mols of alkylene oxide to be added is preferably 2 to 100 mol, more preferably 4 to 80 mol, further preferably 6 to 60 mol, per mol of polyol.

A C2-4 alkylene oxide is suitable for the alkylene oxide. Examples of the C2-4 alkylene oxide include ethylene oxide, propylene oxide, butyleneoxide, and tetrahydrofurane. Among them, ethylene oxide is particularly preferable.

The alkylene oxide may be used solely or in a combination of two or more kinds. When using two or more kinds of alkylene oxides, the oxide may have any sequence order, i.e., blocked, random or a mixed. When using two or more kinds of alkylene oxides, the alkylene oxide preferably contains ethylene oxide. More preferably, the content of ethylene oxide is 30 to 100 mol %, preferably 50 to 100 mol %, more preferably 70 to 100 mol %, based on the total amount of alkylene oxide.

Triple Functional Polymerizable Unsaturated Monomer (c-4-2)

Examples of the triple functional polymerizable unsaturated monomer (c-4-2) include tri(meth) acrylate of polyol having three or more hydroxy groups in each molecule, and tri(meth) acrylates of polyol to which alkylene oxide is added.

Examples of polyol having three or more hydroxy groups in each molecule include pentaerythritol, trimethylolpropane, glycerin, dipentaerythritol, tripentaerythritol, diglycerin, triglycerin, ditrimethylolpropane, tris trimethylolpropane and cyclohexane tetraol.

The number of mols of alkylene oxide to be added to the tri (meth) acrylate is preferably 3 to 200 mol, more preferably 6 to 150 mol, further preferably 9 to 100 mol, per mol of polyol.

A C2-4 alkylene oxide is suitable for the alkylene oxide. Examples of the C2-4 alkylene oxides include ethylene oxide, propylene oxide, butyleneoxide, and tetrahydrofurane. Among them, ethylene oxide is particularly preferable.

The alkylene oxide may be used solely or in a combination of two or more kinds. When using two or more kinds of alkylene oxides, the oxide may have any sequence order, i.e., blocked, random or a mixed. When using two or more kinds of alkylene oxides, the alkylene oxide preferably contains ethylene oxide. More preferably, the content of ethylene oxide is 30 to 100 mol %, preferably 50 to 100 mol %, more preferably 70 to 100 mol %, based on the total amount of alkylene oxide.

4 to 8 Functional Polymerizable Unsaturated Monomer (c-4-3)

Examples of 4 to 8 functional polymerizable unsaturated monomers (c-4-3) include tetra (meth) acrylate, penta (meth) acrylate, hexa (meth) acrylate, hepta (meth) acrylate, octa (meth) acrylate of polyol having four or more hydroxyl groups in each molecule, and tetra (meth) acrylate, penta (meth) acrylate, hexa (meth) acrylate, hepta (meth) acrylate, or octa (meth) acrylate of polyol to which alkylene oxide is added.

Examples of the polyol having four or more hydroxyl groups in each molecule include penta erythritol, dipenta erythritol, tripenta erythritol, tetrapenta erythritol, hexapenta erythritol, diglycerin, triglycerin, ditrimethylolpropane, tris trimethylolpropane, cyclohexane tetraol, and sorbitan.

The number of mols of alkylene oxide to be added to the tetra (meth) acrylate, penta (meth) acrylate, hexa (meth) acrylate, hepta (meth) acrylate, or octa (meth) acrylate as polyol alkylene oxide adducts is preferably 3 to 200 mol, more preferably 6 to 150 mol, further preferably 9 to 100 mol, per mol of polyol.

A C2-4 alkylene oxide is suitable for the alkylene oxide. Examples of the C2-4 alkylene oxide include ethylene oxide, propylene oxide, butyleneoxide, and tetrahydrofurane. Among them, ethylene oxide is particularly preferable.

The alkylene oxide may be used solely or in a combination of two or more kinds. When using two or more kinds of alkylene oxides, the alkylene oxide may have any sequence order, i.e., blocked, random or mixed. When using two or more kinds of alkylene oxides, the alkylene oxide preferably contains ethylene oxide. More preferably, the content of ethylene oxide is 30 to 100 mol %, preferably 50 to 100 mol %, more preferably 70 to 100 mol %, based on the total amount of alkylene oxide.

In terms of finish properties and the like, the aforementioned double functional polymerizable unsaturated monomer (c-4-1) and/or the triple functional polymerizable unsaturated monomer (c-4-2) are suitable for the polymerizable unsaturated monomer (c-4).

Among them, polyoxyalkylene glycol di(meth) acrylate, tri(meth) acrylate to which glycerin alkylene oxide is added, tri(meth) acrylate to which trimethylol propane alkylene oxide is added, and tri(meth) acrylate to which pentaerythritol alkylene oxide adduct is added are preferable. Further, polyoxyalkylene glycol di(meth) acrylate and tri(meth) acrylate to which glycerin alkylene oxide is added are more preferable, and polyoxyalkylene glycol di(meth) acrylate is particularly preferable.

Other Polymerizable Unsaturated Monomers (c-5)

Examples of the (meth) acrylate-copolymer-based thickeners include copolymers of polymerizable unsaturated monomers that contain another polymerizable unsaturated monomer (c-5) in addition to the unsaturated monomers (c-1) to (c-4).

Another polymerizable unsaturated monomer (c-5) is not particularly limited insofar as it is a polymerizable unsaturated monomer co-polymerizable with the polymerizable unsaturated monomers (c-1) to (c-4). In terms of the smoothness of the resulting coating film, preferable examples of polymerizable unsaturated monomers (c-5) include ethylene unsaturated carboxylic acid (salt), polyoxyalkylene (with 2 to 100 mol of alkylene oxides) (meth) acrylate mono-ester, alkoxy polyalkylene glycol (with 2 to 100 mol of alkylene oxides) (meth) acrylic ester, polymerizable unsaturated monomer containing a hydroxy alkyl(meth) acrylate and an amide-group-containing polymerizable unsaturated monomer, preferably crotonic acid, isocrotonic acid, itaconic acid, maleic acid, maleic anhydride, fumaric acid, polyoxyethylene (with 2 to 100 mol of ethylene oxides) mono-(meth) acrylate, C1-6 aliphatic alcohol ethylene oxide adduct (with 2 mol to 100 mol of ethylene oxides) (meth) acrylate, hydroxy methyl (meth) acrylate, 2-hydroxyethyl (meth)acrylate, dihydroxyethyl (meth)acrylate and (meth)acrylamide, more preferably maleic acid, fumaric acid, polyoxyethylene (with 2 to 100 mol of ethylene oxides) mono-(meth) acrylate, 2-hydroxyethyl (meth)acrylate, dihydroxyethyl (meth)acrylate and (meth) acrylamide.

Each of the polymerizable unsaturated monomers (c-1) to (c-5) may be used solely or in a combination of two or more kinds.

The (meth) acrylate-copolymer-based thickener is obtained through copolymerization of the polymerizable unsaturated monomer mixture containing the polymerizable unsaturated monomers (c-1) to (c-4), and also contains polymerizable unsaturated monomer (c-5) as necessary. The proportions of the polymerizable unsaturated monomers (c-1) to (c-5) are set to the following ratios based on the gross mass of polymerizable unsaturated monomers, i.e., the gross mass of the monomers (c-1) to (c-5).

(meth) acrylate (salt) (c-1): 1 to 50 mass %, preferably 1 to 45 mass %, more preferably 7 to 40 mass %;

Polymerizable unsaturated monomer (c-2): 5 to 60 mass %, preferably 10 to 55 mass %, more preferably 20 to 50 mass %;

Alkyl (meth) acrylate having a C1-4 alkyl group (c-3): 5 to 60 mass %, preferably 7 to 50 mass %, more preferably 10 to 40 mass %;

Polymerizable unsaturated monomer having two or more polymerizable unsaturated groups in each molecule (c-4): 0.05 to 5 mass %, preferably 0.07 to 4 mass %, more preferably 0.1 to 3 mass %;

Another polymerizable unsaturated monomer (c-5): 0 to 20 mass %, preferably 0 to 15 mass %, more preferably 0 to 10 mass %.

By setting the proportions of polymerizable unsaturated monomers (c-1) to (c-5) within the above ranges, the finish properties etc. further improve.

The copolymerization of the polymerizable unsaturated monomer (c-1) to (c-5) may be performed using conventionally known methods (e.g., the methods disclosed in Japanese Unexamined Patent Publication No. 2004-27208) such as emulsion polymerization, solution polymerization, suspension polymerization, or mass polymerization. Particularly emulsion polymerization and solution polymerization are preferably used, more preferably solution polymerization is used.

Hydrophobic Solvent (D)

The hydrophobic solvent (D) used for the aqueous coating composition of the present invention is a C6-14 organic solvent, not more than 10 g, preferably not more than 5 g, more preferably not more than 1 g of which is dissolved in 100 g of water at 20° C. Examples of the hydrophobic solvents (D) include alcohol-based solvents such as n-hexanol, n-octanol, 2-octanol, 2-ethyl hexanol, n-decanol, isododecanol, benzyl alcohol, ethylene glycol 2-ethylhexyl ether, propylene glycol n-butyl ether, dipropylene glycol n-butyl ether, tripropylene glycol n-butyl ether, propylene glycol 2-ethylhexyl ether, or propylene glycol phenyl ether; ketone-based solvents such as ethyl n-amylketone or diisobutyl ketone. They are used solely or in a combination of two or more kinds.

In terms of the sag resistance of the coating composition, smoothness of the resulting coating film etc., alcohol-based hydrophobic solvents are preferably used as the hydrophobic solvent (D), more preferably C7-14 alcohol-based hydrophobic solvents, particularly preferably at least one alcohol-based hydrophobic solvent selected from the group consisting of n-octanol, 2-octanol, isododecanol, 2-ethyl-1-hexanol, ethylene glycol 2-ethylhexyl ether, propylene glycol n-butyl ether, and dipropylene glycol n-butyl ether.

Aqueous Coating Composition

The aqueous coating composition of the present invention contains thickener (C) and hydrophobic solvent (D) within the following range based on the gross amount of the polyester resin (A) and the curing agent (B) in the aqueous coating composition.

Thickener (C): 0.01 to 3 mass %, preferably 0.02 to 2 mass %, more preferably 0.02 to 1 mass %;

Hydrophobic solvent (D): 4 to 20 mass %, preferably 5 to 18 mass %, more preferably 6 to 15 mass %.

The content of the polyester resin (A) in the aqueous coating composition of the present invention is 40 to 90 mass %, preferably 50 to 85 mass %, more preferably 60 to 80 mass % (solid mass), and the content of the polyester curing agent (B) in the aqueous coating composition of the present invention is 10 to 60 mass %, preferably 15 to 50 mass %, more preferably 20 to 40 mass % (solid mass), based on the gross amount of Components (A) and (B).

The aqueous coating composition of the present invention expresses pseudoplasticity due to the interaction between the polyester resin (A), the thickener (C) containing a hydrophobic group and the hydrophobic solvent (D); therefore, for example, when the coating composition is applied under high humidity, the viscosity of the applied composition will not significantly decrease, and thereby ensures desirable sag resistance.

Moreover, even though the solid content of the applied composition generally increases under low humidity, the viscosity of the applied composition does not greatly increase, and the coating surface is very smooth. By causing such appropriate interactions, the aqueous coating composition of the present invention ensures desirable finishing appearance.

In addition to the polyester resin (A), the aqueous coating composition of the present invention may contain modifier resins such as polyurethane resin, polyester resin, acrylic resin, alkyd resin, silicon resin, fluorocarbon resin, or epoxy resin.

Further, when the modifier resin has a crosslinking functional group such as a carboxy group, an epoxy group and the like, the coating composition may contain, as the curing agent (B), a curing agent having a crosslinking functional group reactable with the functional group of the modifier resin.

Preferable examples of such curing agents include epoxy-containing compounds, carboxy-containing compounds, and carbodiimide group-containing compounds reactable with the crosslinking functional group. Carbodiimide-group-containing compounds are particularly preferable.

The aqueous coating composition of the present invention may contain various known colored pigments, luster pigments and/or extenders for use in coating compositions. Examples of the colored pigments include titanium dioxide, zinc oxide, lead sulfate, calcium plumbate, zinc phosphate, aluminum phosphate, zinc molybdate, calcium molybdate, berlin blue, ultramarine blue, cobalt blue, copper phthalocyanine blue, indanthrone blue, chrome yellow, synthetic yellow iron oxide, transparent iron oxide red (yellow), bismuth vanadate, titanium yellow, zinc yellow, monoazo yellow, isoindolinone yellow, metallic complex azo yellow, quinophthalone yellow, benzimidazolone yellow, iron oxide red, minium, monoazo red, quinacridone red, azo-lake (Mn salt), quinacridone magenta, ansanthrone orange, dianthraquinonyl red, perylene maroon, quinacridone magenta, perylene red, diketo pyrrolo-pyrrole chrome vermilion, chlorination phthalocyanine green, bromination phthalocyanine green, pyrazolone orange, benzimidazolone orange, dioxazine violet, and perylene violet. Examples of the luster pigments include non leafing or leafing aluminium (including evaporated aluminium), copper, zinc, brass, nickel, aluminum oxide, mica, aluminum oxides coated with titanium oxide or iron oxide, mica coated with titanium oxide or iron oxide, glass flake, and holographic pigment. Examples of the extenders include talc, clay, kaolin, barium sulfate, barium carbonate, calcium carbonate, silica, and alumina white. These pigments may be used solely or in a combination of two or more kinds.

The content of the colored pigment is preferably 1 to 150 mass %, more preferably 20 to 120 mass %, further preferably 30 to 100 mass %, based on the gross amount (solid content) of the polyester resin (A) and the curing agent (B) in the coating composition.

The content of the extender is preferably 1 to 100 mass %, more preferably 2 to 80 mass %, further preferably 2 to 60 mass %, based on the gross amount (solid content) of the polyester resin (A) and the curing agent (B) in the coating composition.

As necessary, the aqueous coating composition of the present invention may further contain various known additives for use in coating compositions. Examples of the additives include luster pigments, thickeners other than the thickener (C), curing catalysts, dyes, UV absorbers, light stabilizers, dispersants, antioxidants, antifoamers, plasticizers, organic solvents other than the hydrophobic solvent (D), surface adjusters, and sedimentation inhibitors. These additives may be used solely or in a combination of two or more kinds.

Examples of the thickeners include inorganic thickeners such as silicate, metal silicate (they are easily obtained by, for example, purifying or synthesizing clay minerals such as hectorite or bentonite by a known method using metals such as sodium, magnesium, or lithium), montmorillonite or colloid alumina; polyacrylic acid thickeners such as copolymers of (meth) acrylate and (meth) acrylic ester or sodium polyacrylates (examples of commercial items: Primal ASE-60, Primal TT-615, Primal RM-5 (Rohm and Haas Company), SN Thickener 613, SN Thickener 618, SN Thickener 630, SN Thickener 634, SN Thickener 636 (San Nopco LTD.)); fibrous derivative thickeners such as carboxymethylcellulose, methylcellulose or hydroxyethylcellulose; protein thickeners such as casein, sodium caseinate or ammonium caseinate; alginic acid thickeners such as sodium alginate; polyvinyl thickeners such as polyvinyl alcohol, polyvinyl pyrrolidone, or polyvinylbenzyl ether copolymer; polyether thickeners such as Pluronic polyether, polyether dialkyl ester, polyether dialkyl ether or polyether epoxy degenerating product; maleic anhydride copolymer thickener such as partial ester of vinyl methyl ether-maleic anhydride copolymer; and polyamide thickeners such as polyamideamine salt. These thickeners may be used solely or in a combination of two or more kinds.

When the coating composition contains thickener(s) other than the thickener (C), the content of the thickener is preferably 0.01 to 10 mass %, more preferably 0.05 to 3 mass %, further preferably 0.1 to 2 mass %, based on the gross solid content of the coating composition.

The aqueous coating composition of the present invention may be a one-component coating composition or a multi-component coating composition. However, in terms of the preservative stability, the aqueous coating composition of the present invention is preferably a two-component coating composition consisting of a base component containing the polyester resin (A) and a curing component containing the curing agent (B). Further, generally, it is preferable that the base agent contains a pigment and a solvent, and the curing agent contains a curing catalyst and a solvent.

Method for Forming a Multilayer Coating Film

The aqueous coating composition of the present invention is superior in sag resistance, and thereby allows for formation of a coating film having an excellent finishing appearance and desirable coating surface smoothness etc. The coating composition is therefore useful as, for example, an inter-coating composition or a top-coating composition, particularly as an inter-coating composition.

The coating film formation using the aqueous coating composition of the present invention may be performed using various conventionally-known methods, such as air-spray coating, airless-spray coating, rotary atomization coating, curtain coating or the like. During these methods, electrostatic impression may be performed as necessary. The rotary atomization coating using electrostatic impression is particularly preferable. The coatings using the above methods are performed either once or several times until the film has a desired thickness. The film thickness is preferably in a range from 3 to 100 μm, more preferably 5 to 60 μm, and further preferably 10 to 50 μm after curing. The curing of the coating film is performed by heating, for example, at 120 to 170° C., preferably 130 to 160° C. for about 10 to 40 minutes. Such thermal curing may be performed by well-known heating methods, using a baking furnace such as a hot blast stove, an electric furnace, an infrared beam heating furnace or the like. As necessary, preheating at about 50 to 80° C. may be performed for 3 to 10 minutes before the thermal curing, so as to facilitate vaporization of volatile components such as the solvent.

Preferable examples of the substrates as coating targets include, but are not limited to, steel plates such as cold-rolled steel plates, galvanized steel plates, zinc-alloy-plated steel plates, stainless steel plates or tinned steel plates; metal bases such as aluminium plates or aluminium-alloy plates; and various plastic materials. The target may also be a vehicle, such as automobiles, two-wheeled vehicles, or container tracks.

The substrate may be a metal base, a vehicle, or the like having a modified metal outer surface processed by phosphate treatment, chromate treatment, multiple oxide treatment or the like.

The coating target may have a base coating (e.g., cathodic electrodeposition coating).

When applied to the target, the viscosity of the aqueous coating composition of the present invention may be adjusted as necessary by adding additives or by diluting the composition with water or an organic solvent etc.

The adequate viscosity is determined depending on the formation of the coating liquid; however, when measured by a Ford cup viscosity meter No. 4, the viscosity is generally about 20 to 60 seconds, preferably about 25 to 50 seconds at 20° C. Further, in this case, the solid content of the coating composition of the present is about 40 to 65 mass %, preferably about 45 to 60 mass %.

For the cationic electrodeposition coating composition, any known primers for use in general metal base coating may be used. Examples of the primers include basic water-soluble and water-dispersible resins, which can be dissolved or dispersed in water by being neutralized by organic acids or inorganic acids, such as epoxy resins, acrylate resins or polybutadiene resins having a large number of amino groups in the resin structure. These resins comprise a neutralizing agent, pigment (colored pigment, extender, antirust pigment etc.), a hydrophilic solvent, water, a curing agent (as necessary), additives etc.

Examples of the neutralizing agents for dissolving or dispersing the basic water-soluble or water-dispersible resin include organic acids such as acetic acids, hydroxyl acetic acids, propionic acids, butyric acids, lactic acids or glycine; inorganic acids such as sulfuric acids, hydrochloric acids or phosphoric acid. The content of the neutralizing agent should fall within such a range that the neutralization equivalent with respect to the amine value (generally about 30 to 200 mg KOH/g) is about 0.1 to 1.0.

The cationic electrodeposition coating composition is diluted with deionized water to obtain an electrodeposition bath that is adjusted to a pH of 5.5 to 8.0 and has a solid content ranging from 5 to 40 mass %, preferably 8 to 30 mass %. The cationic electrodeposition coating composition is applied to the substrate using a standard coating-layer-electrodeposition method. The film thickness of the electrodeposition coating film is preferably about 10 to 40 μm, more preferably about 15 to 30 μm after curing. The curing of the obtained cationic electrodeposition coating film is performed preferably at about 140 to 210° C., more preferably about 160 to 180° C. for 10 to 40 minutes. The aqueous coating composition of the present invention is thus applied to the substrate as an inter-coating composition.

The application and thermal curing of the aqueous coating composition of the present invention as an inter-coating composition can be performed in the aforementioned manner.

On the cured or uncured inter-coating film formed of the aqueous coating composition of the present invention, a top-coating composition is applied. Any well-known top-coating compositions may be used. As the top-coating composition, various liquid coating compositions, such as acrylic resin/amino resin coating compositions, alkyd resin/amino resin coating compositions, polyester resin/amino resin coating compositions, acid resin/epoxy resin coating composition and the like may be used. The liquid coating compositions may be organic solvent coating compositions, or aqueous coating compositions.

These top-coating compositions are classified into, for example, colored coating compositions containing colored pigments, metallic coating compositions containing metallic pigments, clear coating compositions containing little or none of the colored/metallic pigments. In the present method, the top-coating film is formed by selecting an appropriate composition from those coating compositions, by way of a 1-coat method (1-coat, 1-bake), or a 2-coat method (2-coat, 1-bake or 2-coat, 2-bake).

For example, a 1-coat method, which is used for solid color coating, is performed as follows. The colored coating composition is applied onto the thermally-cured inter-coating film so that the layer has a thickness of about 10 to 40 μm after curing; the layer is preheated as necessary at about 50 to 80° C. for 3 to 10 minutes; and the layer is baked at about 100 to 160° C. for 10 to 40 minutes. A 2-coat 1-bake method (2C1B) or a 2-coat 2-bake method (2C2B), which is used for solid or metallic color coating, is performed as follows. The colored coating composition or the metallic coating composition is applied onto the thermally-cured inter-coating film so that the layer has a thickness of about 10 to 30 μm after curing; the layer is preheated as necessary at about 50 to 80° C. for 3 to 10 minutes; the clear coating composition is applied onto the thermally-cured or uncured inter-coating film so that the film has a thickness of about 20 to 60 μm after curing; the layer is preheated as necessary at about 50 to 80° C. for 3 to 10 minutes; and the layer is baked at about 120 to 160° C. for 10 to 40 minutes.

The following is a preferred embodiment of the present invention to form a multilayer coating film, which performs the steps (1) to (4).

Step (1)

The multilayer coating film forming method of the present invention first applies an aqueous coating composition of the present invention (inter-coating composition (may also be referred to as an aqueous first colored coating composition (X) hereinafter) containing a polyester resin (A), a curing agent (B), a thickener (C) and a hydrophobic solvent (D) on a substrate.

The application of the aqueous coating composition can be performed by the aforementioned method. The aqueous first colored coating composition (X) of the present invention is preferably applied onto the substrate so that the dried layer has a thickness of 30 μm and the film after 10-minutes baking at 80° C. has a gel fraction of 1 to 95 mass %, preferably 15 to 95 mass %, more preferably 30 to 80 mass %. With such adjustments, desirable smoothness and the distinctness of the resulting coating film are obtained.

Step (2)

On the layer of the aqueous first colored coating composition (X) thus formed, a first top-coating composition (may also be referred to as an aqueous second colored coating composition (Y) hereinafter) is applied.

Before the aqueous second colored coating composition (Y) is applied, the layer of the aqueous first colored coating composition (X) is preferably adjusted to have a solid content of 70 to 100 mass %, preferably 80 to 100 mass %, more preferably 90 to 100 mass %, for example, by performing preheating, air blow or the like. The layer is more preferably adjusted to have a gel fraction of 1 to 95 mass %, further preferably 15 to 95 mass %, particularly preferably 30 to 60 mass %.

The preheating is generally performed by directly or indirectly heating the coated substrate in a drying furnace at about 50 to 110° C., preferably at about 60 to 90° C., for about 1 to 30 minutes. The air blow is generally performed by blowing air at room temperature or at about 25° C. to 80° C. onto the coated surface of the substrate.

The solid content is measured as follows.

First, the aqueous first colored coating composition (X) is applied to the substrate and to an aluminum foil at the same time. The mass ($W_1$) of the aluminum foil is measured in advance. Then, the coated aluminum foil is subjected to preheating etc. and is collected to measure its mass ($W_2$), immediately before the aqueous second colored coating composition (Y) is applied. Thereafter, the aluminum foil is dried at 110° C. for 60 minutes, cooled to room temperature in a desiccator, and then the mass ($W_3$) of the aluminum foil is measured and the solid content is found according to the following formula.

$$\text{Solid content(mass \%)} = \{(W_3 - W_1)/(W_2 - W_1)\} \times 100$$

In the specification of the present invention, the following method is used to find a gel fraction.

First, the aqueous first colored coating composition (X) is applied to the substrate and to a polypropylene plate at the same time. The mass ($W_a$) of the polypropylene plate is measured in advance. After the coated polypropylene plate is preheated, the polypropylene plate is collected immediately before the aqueous second colored coating composition (Y) is applied.

Next the mass ($W_b$) of the polypropylene plate with the first colored coating film is measured. After placing the polypropylene plate with the coating film in a 300-mesh stainless steel container, extraction is performed for five hours in an equivalent mass mixture solution of acetone and methanol at 64° C. After drying the extract at 110° C. for 60 minutes, the mass ($W_c$) of the polypropylene plate with the remaining coating film is measured. The gel fraction is found as an insoluble coating film residual ratio (mass %) according to the following formula.

$$\text{Gel fraction(mass \%)} = (W_c - W_a)/(W_b - W_a) \times 100$$

Next, the aqueous second colored coating composition (Y) is applied on the first colored coating film.

An example of the aqueous second colored coating composition (Y) is a coating composition obtained by dissolving or dispersing a base resin having a crosslinking functional group such as a carboxy group, hydroxy group or the like, i.e., an acrylic resin, a polyester resin, an alkyd resin, a urethane resin, an epoxy resin etc.; and a resin component formed of a crosslinking agent such as a blocked or unblocked polyisocyanate compound, a melamine resin, an urea resin or the like in water, together with a pigment and/or other additives.

The pigment component may be any pigment from the aforementioned pigment examples mentioned in the description of the aqueous first colored coating composition (X), such as the colored pigments, luster pigments, extenders etc. By using a luster pigment as at least one of the pigment components, it is possible to form a metallic or pearl coating film having a density in appearance.

The aqueous second colored coating composition (Y) may be applied using any well-known methods, such as air-spray coating, airless-spray coating, rotary atomization coating, curtain coating or the like. Electrostatic impression may be performed during the coating. The thickness of the coating film is generally 5 to 40 μm, preferably 10 to 30 μm after curing.

The applied film of the aqueous second colored coating composition (Y) is dried by, for example, preheating, air blow or the like, at about 50 to 110° C., preferably about 60 to 90° C., for 1 to 60 minutes.

Step (3)

After thus forming the coating film of the aqueous second colored coating composition (Y), a second top-coating composition (hereinafter also referred to as a clear coating composition (Z)) is applied.

The clear coating composition (Z) may be realized by any known coating composition for automobile bodies, such as organic solvent thermosetting coating compositions, aqueous thermosetting coating compositions, and thermosetting powder coating compositions, which contain a base resin such as an acrylic resin, a polyester resin, an alkyd resin, a urethane resin, an epoxy resin, or a fluorocarbon resin having a crosslinking functional group such as a hydroxy group, a carboxy group, an epoxy group, or a silanol group; and, as a resin component, a crosslinking agent such as a melamine resin, a urea resin, a blocked or unblocked polyisocyanate compound, carboxy-containing compound or resin, or epoxy-containing compound or resin. Among them, a thermosetting coating composition containing a carboxy-containing resin and an epoxy group containing resin, and a thermosetting coating composition containing a hydroxy group-containing resin and a blocked or unblocked polyisocyanate compound are particularly preferable.

The clear coating composition (Z) may be realized by a one-component coating composition, or a two-component coating composition such as a two-component urethane resin coating composition.

As required, the clear coating composition (Z) may contain colored pigments, luster pigment, dyes and the like insofar as the transparency is not impaired. The clear coating composition (Z) may further contain extenders, UV absorbers, antifoamers, thickeners, antifoamers, rust retardants, surface adjusters, and the like The application of the clear coating composition (Z) on the coating film layer of the aqueous second colored coating composition (Y) may be performed by any well-known methods, for example, air-spray coating, airless-spray coating, rotary atomization coating or the like, optionally with electrostatic impression. The thickness of the clear coating layer is 10 to 60 μm, preferably 25 to 50 μm after drying.

Step (4)

The three layers: the first colored coating film, the second colored coating film and the clear coating film, of the multilayer coating film may be simultaneously dried by any general coating-film-baking methods, such as hot-air heating, infrared heating, or high-frequency heating, at about 80 to 170° C., preferably about 120 to 160° C. for about 20 to 40 minutes.

EXAMPLES

The following more specifically describes the present invention with reference to some Production Examples, Examples and Comparative Examples.

The present invention is however not limited to those Examples.

In the following, "part" and "%" denote "part by mass" and "percentage by mass". The film thickness of the coating film denotes the thickness of a cured coating film.

Production of Polyester Resin (A)

Production Examples 1 to 17

According to the ratios shown in FIG. 1, 17 samples of an acid/alcohol mixture were prepared. Each sample was placed in a four-neck flask having a heating unit, a stirrer, a thermometer, a reflux condenser and a distillation column. The mixture was first heated to 160° C. and then further heated from 160° C. to 230° C. for three hours while distilling out the condensed water using the distillation column. Thereafter, the mixture was reacted at 230° C. for 2 hours.

In FIG. 1, "(a-1)+(a-2)(wt %)" denotes the total content (mass %) of the straight-chain dicarboxylic acid (a-1) having a carbon number of 8 or more, and the straight-chain diol (a-2) having a carbon number of 8 or more, based on the gross amount of the alcohol component and the acid component.

Next, the distillation column was replaced with a water separator. Toluene was added to the reaction product as required. The mixture was kept under reflux at 230° C. and the condensation water was separated and distilled out by a water separator to perform the condensation reaction.

When the resin acid value became 2, toluene was removed under reduced pressure and the reaction product was cooled to 170° C. Trimellitic anhydride was added to the reaction product in the amount shown in Table 1, and the mixture was subjected to an addition reaction at 170° C. for 60 minutes. Then, 10 mass % of propylene glycol monopropyl ether was added to the reaction product. After the temperature was adjusted to 85° C., the acid value was measured. The reaction product was neutralized by N,N-dimethylethanolamine that is a 0.9 equivalent of the acid value of the reaction product. Further, deionized water was gradually added to obtain a water dispersion, thereby obtaining a polyester resin ((PE-1) to (PE-17)). Table 1 shows solid content (%), number-average molecular weight, hydroxy group value, and acid value of each polyester resin obtained above. PE-17, one of Production Examples, had poor water-dispersibility, and the water dispersion of PE-17 was not obtained.

The acid value measurement was carried out according to JISK-5601-2-1 (1999). More specifically, each sample was dissolved by a mixture solution of toluene/ethanol (2:1 in volume), and the sample was titrated with a potassium hydroxide solution using phenol phthalein as an indicator. Then, the acid value was found according to the following equation.

$$\text{acid value}(mgKOH/g) = 56.1 \times V \times C/m$$

wherein V represents titration amount (ml), C represents concentration (mol/l) of titrate liquid, and m represents solid content by weight (g) of the sample.

The hydroxy group value measurement was carried out according to JISK-0070 (1992). More specifically, 5 ml of acetylating reagent (anhydrous acetic acid pyridine solution obtained by adding 25 g of pyridine to anhydrous acetic acid, adjusted to 100 ml in total) was added to the sample, and the sample was heated in a glycerin bath. Thereafter, the sample was titrated in a potassium hydroxide solution using phenol phthalein as an indicator. Then, the hydroxy group value was found according to the following equation.

$$\text{hydroxy group value}(mgKOH/g) = [V \times 56.1 \times C/m] + D$$

wherein V represents titration amount (ml), C represents concentration (mol/l) of titrate liquid, m represents solid content by weight (g) of the sample, and D represents acid value (mgKOH/g) of the sample (hereinafter, a hydroxy group value and an acid value are measured using the same method in the specification of the present invention)

TABLE 1

| Production Example | 1 | 2 | 3 | 4 | 5 | 6 | 7 | 8 | 9 | 10 |
|---|---|---|---|---|---|---|---|---|---|---|
| Polyester resin (PE-) | 1 | 2 | 3 | 4 | 5 | 6 | 7 | 8 | 9 | 10 |
| Dodecanoic diacid | 108 | 150.5 | 254.4 | 152.3 | 153.4 | | | 148.2 | 152.3 | |
| Hexadecanoic diacid | | | | | | | | | | 141.3 |
| Adipic acid | 102.8 | 73.1 | | 73.9 | 74.5 | 86.7 | 85.6 | 60.9 | 74 | 88.8 |
| Isophthalic acid | 149.4 | 147 | 140.8 | 148.8 | 149.8 | 223.3 | 220.6 | 144.7 | 148.8 | 145.1 |
| Hexahydrophthalic anhydride | 180.4 | 177.9 | 170.3 | 180 | 181.2 | 207.2 | 204.7 | 175.1 | 180.1 | 175.6 |
| Neopentyl glycol | 143.8 | 141.5 | 127.8 | 143.2 | 144.2 | 95.6 | 90.3 | 59.7 | 184.2 | 139.7 |
| Butyl ethyl propane diol | 219.1 | 215.6 | 194.7 | 218.2 | 219.7 | 152 | 143.8 | 212.3 | 218.3 | 212.8 |
| 1,9-Nonanediol | | | | | | 158.3 | 156.3 | | | |
| 1,6-Hexanediol | | | | | | | | | | |
| Trimethylolpropane | 160.2 | 157.7 | 171.1 | 159.5 | 160.6 | 151.2 | 160 | 258.7 | 106.4 | 155.6 |
| Trimellitic anhydride | 31.5 | 31 | 31.2 | 19.4 | 12.8 | 19.7 | 31.5 | 30.6 | 31.4 | 32.8 |
| (a-1) + (a-2) (wt %) | 9.86 | 13.75 | 23.33 | 13.90 | 13.99 | 14.47 | 14.30 | 13.59 | 13.90 | 0.00 |
| Solid content by weight (%) | 48 | 48 | 45 | 50 | 55 | 50 | 50 | 48 | 52 | 50 |
| Number average molecular weight | 1430 | 1450 | 1509 | 1433 | 1420 | 1412 | 1428 | 1320 | 1430 | 1460 |

TABLE 1-continued

| | | | | | | | | | | |
|---|---|---|---|---|---|---|---|---|---|---|
| Hydroxy group value (mgKOH/g) | 133 | 131 | 134 | 136 | 139 | 134 | 133 | 180 | 111 | 131 |
| Acid value (mgKOH/g) | 20.4 | 20.1 | 20.2 | 13.4 | 8.9 | 13.5 | 20.4 | 20 | 20.1 | 19.2 |

| Production Example | 11 | 12 | 13 | 14 | 15 | 16 | 17 |
|---|---|---|---|---|---|---|---|
| Polyester resin (PE-) | 11 | 12 | 13 | 14 | 15 | 16 | 17 |
| Dodecanoic diacid | 253.2 | | | 37.2 | | | 154.1 |
| Hexadecanoic diacid | | | | | | | |
| Adipic acid | | | 182.7 | 153.7 | 179.9 | 185.5 | 74.8 |
| Isophthalic acid | 134.1 | 261.9 | 147.4 | 161.3 | 163.6 | 168.7 | 150.4 |
| Hexahydrophthalic anhydride | 169.5 | 237.2 | 186.5 | 187 | 189.7 | 195.7 | 182 |
| Neopentyl glycol | 127.2 | 51.3 | 139.9 | 148.8 | 150.9 | 53.4 | 144.8 |
| Butyl ethyl propane diol | 193.7 | 72.1 | 213.1 | 226.6 | 230 | 81.3 | 220.7 |
| 1,9-Nonanediol | | 246.5 | | | | | |
| 1,6-Hexanediol | | | | | | 250 | |
| Trimethylolpropane | 170.3 | 174.4 | 187.3 | 165.7 | 168.2 | 150.3 | 161.4 |
| Trimellitic anhydride | 40.2 | 41.1 | 41.9 | 20.2 | 19.7 | 20.3 | 8.3 |
| (a-1) + (a-2) (wt %) | 23.27 | 22.73 | 0.00 | 3.38 | 0.00 | 0.00 | 14.05 |
| Solid content by weight (%) | 45 | 45 | 45 | 50 | 50 | 50 | |
| Number average molecular weight | 1436 | 1483 | 1420 | 1464 | 1440 | 1402 | 1420 |
| Hydroxy group value (mgKOH/g) | 134 | 133 | 143 | 137 | 139 | 134 | 141 |
| Acid value (mgKOH/g) | 25.5 | 26 | 25 | 13.8 | 13.5 | 13.9 | 6 |

Curing agent (B)

The following are the compositions of the curing agents in Table 2 below.

MF-1: methyl-butyl-mixed etherified melamine resin, weight-average molecular weight=1000, solid content=80%, mole ratio of butoxy groups to methoxy groups=30/70 (butoxy/methoxy).

MF-2: methoxy etherified melamine resin, weight-average molecular weight=800, solid content=80%.

BNCO-1: Bayhydur VP LS-2310, water dispersible blocked isocyanate, NCO %=9.9%, solid content=38%.

Production of Thickener (C)

Example 18

420 parts of polyethylene glycol 6000 (molecular weight=6,000) and 177 parts of polyether monol obtained by adding 20 mol of ethylene oxide to cholesterin were placed in a 1000 ml four-neck flask having a heating unit, a thermometer, a nitrogen introducing tube and a high-viscosity stirrer. The mixture was subjected to a dehydration reaction under reduced pressure (5 to 10 mmHg) at 80 to 90° C. for 3 hours to adjust the moisture content of the system to 0.03%. Subsequently, the reaction product was cooled to 70° C., and 23.5 parts of hexamethylene diisocyanate were added. The obtained mixture was reacted at 85 to 90° C. under nitrogen stream until the isocyanate content tracked by IR became substantially 0% (3 hours), thereby obtaining a thickener (C-1) in which X and Z in Formula (1) are each a cholesteryl group, Y is a hexamethylene group, each of OR, OR', and OR" is an oxyethylene group, and a, b, c and d are 20, 136, 1, and 20, respectively.

Production Example 19

500 parts of polyethylene glycol 10000 (molecular weight=10,000) and 17.2 parts of polyether monol obtained by adding 2 mol of ethylene oxide to lanosterol were placed in a 1000 ml four-neck flask having a heating unit, a thermometer, a nitrogen introducing tube and a high-viscosity stirrer. The mixture was subjected to a dehydration reaction under reduced pressure (5 to 10 mmHg) at 80 to 90° C. for 3 hours to adjust the moisture content of the system to 0.03%. Subsequently, the reaction product was cooled to 70° C., and 11.6 parts of hexamethylene triisocyanate were added.

The obtained mixture was reacted at 80 to 85° C. under a nitrogen stream, until the isocyanate content tracked by IR became substantially 0% (2 hours), thereby obtaining a thickener (C-2) in which X and Z in Formula (1) are each a lanosteryl group, Y is a tolylene group, each of OR, OR' and OR" is an oxyethylene group, and a, b, c, and d are 2, 227, 2, and 2, respectively.

Production Example 20

420 parts of polyethylene glycol 6000 (molecular weight=6,000) and 103 parts of polyether monol obtained by adding 10 mol of ethylene oxide to 2-octyldodecanol were placed in a 1000 ml four-neck flask having a heating unit, a thermometer, a nitrogen introducing tube and a high-viscosity stirrer. The mixture was subjected to a dehydration reaction under reduced pressure (5 to 10 mmHg) at 80 to 90° C. for 3 hours to adjust the moisture content of the system to 0.03%. Subsequently, the reaction product was cooled to 70° C., and 23.5 parts of hexamethylene diisocyanates were added. The obtained mixture was reacted at 85 to 90° C. under nitrogen stream, until the isocyanate content tracked by IR became substantially 0% (3 hours), thereby obtaining a thickener (C-3) in which X and Z in Formula (1) are each a 2-octyldodecanol group, Y is a hexamethylene group, each of OR, OR', and OR" is an oxyethylene group, and a, b, c and d are 10, 136, 1, and 10, respectively.

Production Example 21

350 parts of methyltriglycol were placed in a four neck flask having a heating unit, a stirrer, a thermometer, and a reflux condenser, and were heated to 80 to 90° C.

Under stirring, 20 parts of methacrylic acid, 19.5 parts of acrylate to which 60 mols of n-octadecyl alcohol ethylene oxide is added, a monomer mixture comprised of 60 parts of ethyl acrylate and 0.5 part of diacrylate to which 15 mol of ethylene glycol ethylene oxide is added, and 50 parts of 1% solution of 2,2'-azobis isobutylnitrile in methyl triglycol were added dropwise to the methyltriglycol for 1.5 hours. During the reaction, the reaction temperature was kept at 80 to 90° C. After the addition was completed, the reaction product was kept at the same temperature for 3 hours, and then was cooled to room temperature, thereby obtaining a thickener (C-4) (concentration of the copolymer: 20%).

Production Example 22

500 parts of polyethylene glycol 10000 (molecular weight=10,000) and 35.5 parts of polyether monol obtained by adding 10 mol of ethylene oxide to octadecyl alcohol were placed in a 1000 ml four-neck flask having a heating unit, a thermometer, a nitrogen introducing tube and a high-viscosity stirrer. The mixture was subjected to a dehydration reaction under reduced pressure (5 to 10 mmHg) at 80 to 90° C. for 3 hours to adjust the moisture content of the system to 0.03%. Subsequently, the reaction product was cooled to 70° C., and 18.8 parts of 4,4-diphenylmethane diisocyanate were added. The obtained mixture was reacted at 85 to 90° C. under nitrogen stream, until the isocyanate content tracked by IR became substantially 0% (3 hours), thereby obtaining a thickener (C-5) in which X and Z in Formula (1) are each an octadecyl group, Y is a diphenylmethylene group, each of OR, OR', and OR" is an oxyethylene group, and a, b, c, and d are 10, 227, 2, and 10, respectively.

Production Example 23

500 parts of polyethylene glycol 10000 (molecular weight=10,000) and 6.27 parts of polyether monol obtained by adding 2 mol of ethylene oxide to hexanol were placed in a 1000 ml four-neck flask having a heating unit, a thermometer, a nitrogen introducing tube and a high-viscosity stirrer. The mixture was subjected to dehydration reaction under reduced pressure (5 to 10 mmHg) at 80 to 90° C. for 3 hours to adjust the moisture content of the system to 0.03%. Subsequently, the reaction product was cooled to 70° C., and 11.6 parts of tolylene diisocyanate were added. The obtained mixture was reacted at 80 to 85° C. under nitrogen stream, until the isocyanate content tracked by IR became substantially 0% (2 hours), thereby obtaining a thickener (C-6) in which X and Z in Formula (1) are each a hexyl group, Y is a tolylene group, each of OR, OR', OR" is an oxyethylene group, a, b, c, and d are 2, 227, 3, and 2, respectively.

Production Example 24

350 parts of methyltriglycol were placed in a four neck flask having a heating unit, a stirrer, a thermometer, and a reflux condenser, and were heated to 80 to 90° C. Under stirring, 20 parts of methacrylic acid, 19.5 parts of acrylate to which 30 mols of n-hexyl alcohol ethylene oxide is added, a monomer mixture comprised of 60 parts of propyl acrylate and 0.5 part of diacrylate to which 15 mol of ethylene glycol ethylene oxide is added, and 50 parts of 1% solution of 2,2'-azobis isobutylnitrile in methyltriglycol were added dropwise to the methyltriglycol for 1.5 hours. During the reaction, the reaction temperature was kept at 80 to 90° C. After the addition was completed, the reaction product was kept at the same temperature for 3 hours, and then was cooled to room temperature, thereby obtaining a thickener (C-7) (concentration of the copolymer: 20%).

The following is the details of the thickener (C-8) in Table 2.

Thickener (C-8): Primal ASE-60, produced by Rohm and Haas, solid content=28%.

Production of a Resin for a Pigment Dispersion Paste

Production Example 25

30.4 parts of Cardura E10P (product of Hexion Specialty Chemicals: glycidyl ester of synthetic hyperbranched saturated fatty acid), 41.5 parts of trimethylolpropane, 80.7 parts of anhydrous isophthalic acid, 79.9 parts of adipic acid, and 83.0 parts of neopentylglycols were placed in a four neck flask having a heating unit, a stirrer, a thermometer, a reflux condenser, and a distillation column. The mixture was first heated to 160° C., and then further heated from 160° C. to 230° C. for 3 hours while distilling out the condensation water using the distillation column. Thereafter, the mixture was reacted at 230° C. for 2 hours. Next, the distillation column was replaced with a water separator and toluene was added to the reaction product as required. The mixture was kept under reflux at 230° C. and the condensation water was separated and distilled out by a water separator. The condensation reaction was performed until the resin acid value fell to 2 or less. Subsequently, toluene was distilled out under reduced pressure and the obtained reaction product was cooled to 170° C. Thereafter, 19.6 parts of trimellitic anhydride was added to the reaction product, and the mixture was subjected to an addition reaction at 170° C. for 30 minutes. Then, 10 mass % of propylene glycol monopropyl ether was added to the reaction product, and the temperature was adjusted to 85° C. Thereafter, the reaction product was neutralized by N,N-dimethylethanolamine. Further, deionized water was gradually added to obtain a water dispersion, thereby obtaining a pigment dispersion paste resin with a solid content of 40%.

The acid number, the hydroxy value, and the number average molecular weight of the obtained pigment dispersion paste resin were 40 mgKOH/g, 108 mgKOH/g and 1500, respectively.

Production of Aqueous Coating Composition
(Aqueous Intercoating Composition)

Example 1

1 part of Carbon MA100 (carbon black, Mitsubishi Chemical Corp.), 70 part of JR806 (titanium white, produced by TAYCA CORP.), and 10 parts of MICRO ACE S-3 (fine talc, Nippon Talc Co. Ltd.) were sequentially added to 37.5 parts of the pigment dispersion paste resin obtained in Production Example 25. The mixture was shaken using a paint shaker for 30 minutes to disperse the materials, thereby obtaining a pigment dispersion paste.

114.6 parts (solid content of 55 parts) of polyester resin (PE-1, solid content=48%) obtained in Production Example 1, 37.5 parts of melamine resin MF-1 (methoxy-butoxy-mixed alkylation melamine resin, solid content=80%), and 7 parts of 2-ethyl hexanol were sequentially added to 118.5 parts of the obtained pigment dispersion paste under stirring. Further, deionized water and dimethylethanol amine were added to the mixture, and the resulting mixture was adjusted to have pH 8.5 and a viscosity of 40 seconds at and 20° C. in a No. 4 Ford Cup, thereby obtaining Aqueous Coating Composition 1.

Examples 2 to 20 and Comparative Example 1 to 15

Aqueous coating compositions 2 to 35 were produced from the materials at the proportions specified in Table 2, which were mixed and stirred in the same manner as in Example 1. In Table 2, the proportions other than that for the hydrophobic solvent (D) are based on solid contents.

• Preparation of test plate 1 test plates were prepared in the following manner using Aqueous coating compositions 1 to 35 obtained in Examples 1 to 20 and Comparative Examples 1 to 15.

ELECRON GT-10 (product of Kansai Paint Co. Ltd. cationic electrodeposition paint) was electrodeposited on a cold-rolled sheet steel processed by Palbond #3020 (Nihon Parkerizing Co. Ltd., zinc phosphate treatment agent) so that the layer had a thickness of 20 μm. The layer was cured at 170° C. for 30 minutes.

Each of Aqueous coating compositions 1 to 35 was applied on the electrodeposition layer so that the layer had a thickness of 30 μm. After allowing it to stand for 5 minutes at room temperature, the layer was preheated for 5 minutes at 80° C. Then, the layer was cured by heating at 140° C. for 20 minutes.

Next, an aqueous metallic base coat WBC713 (product of Kansai Paint Co. Ltd., acryl/melamine resin aqueous overcoat color basecoat composition, finished color=silver) so that the layer had a thickness of 15 μm. After allowing it to stand for 3 minutes at room temperature, the layer was preheated for 3 minutes at 80° C. Thereafter, an organic-solvent-type clear-coat composition KINO#1200TW (product of Kansai Paint Co. Ltd., acid/epoxy-setting acrylic resin clear-coat), adjusted to have a viscosity of 25 seconds at 20° C. in a No. 4 Ford Cup using Swasol 1000 (product of COSMO OIL CO. LTD., petroleum aromatic hydrocarbon solvent), was applied so that the layer had a thickness of 35 μm. After allowing it to stand for 7 minutes, the layer was heated for 30 minutes at 140° C. so as to simultaneously cure the base-coat film and the clear-coat film, thereby obtaining a test plate. A revolution atomization bell-shaped coater, "ABB metallic bell coater" (product of ABB), was used as the coater. The application was performed under a booth temperature of 23° C. and a booth humidity of 67%.

The following finished qualities were evaluated for each of the test plates.

The finished quality was measured by Wave Scan (product of BYK).

A Long Wave value (LW) and a Short Wave value (SW) were measured by Wave Scan. The Long Wave value is an index of the amplitude of surface roughness at a wave length of about 1.2-12 mm, which shows the condition of the middle wave portion in the coating surface. A Short Wave value is an index of the amplitude of surface roughness at a wave length of about 0.3-1.2 mm, which shows the condition of the small wave portion in the coating surface. For each Wave Scan value, a greater value denotes a higher surface smoothness. Generally, the surface smoothness is considered desirable when LW is less than 10 and SW is less than 12.

• Preparation of test plate 2 test plates were prepared in the following manner using Aqueous coating compositions 1 to 35 obtained in Examples 1 to 20 and Comparative Examples 1 to 15.

ELECRON GT-10 (product of Kansai Paint Co. Ltd. cationic electrodeposition paint) was electrodeposited on a cold-rolled sheet steel processed by Palbond #3020 (Nihon Parkerizing Co. Ltd., zinc phosphate treatment agent) so that the layer had a thickness of 20 μm. The layer was cured at 170° C. for 30 minutes.

As a substrate, a 11 cm×45 cm electrodeposition coating plate was prepared in the following manner and was provided with fourteen 10 mm-diameter punch holes laid out in a line with a 3 cm distance from the edge and at 2 cm intervals. Another electrodeposition coating plate was prepared and the two plates were aligned. Then, each aqueous coating composition was applied on each plate with a gradient in thickness from 25 μm to 50 μm in the longitudinal direction. The plate with the punch holes was placed horizontally, and the plate without punch holes was placed vertically, and they were allowed to stand for 5 minutes at room temperature. After preheating for 5 minutes at 80° C., the test plates were completed by heating at 140° C. for 20 minutes. The application was performed under a booth temperature of 23° C. and a booth humidity of 78%.

Each plate provided with punch holes was examined to find a portion having a coating composition sagging of 5 mm through a punch hole. The film thickness of the portion was measured by measuring the film thickness of the corresponding portion in the plate with no punch holes, thereby evaluating the sagging limit thickness.

A greater sagging limit thickness denotes a superior sagging resistance.

Table 2 shows evaluation results of the finishing quality and sagging limit thickness for each test plate.

TABLE 2

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Aqueous coating composition | | | 1 | 2 | 3 | 4 | 5 | 6 | 7 | 8 | 9 | 10 |
| Pigment dispersion paste resin | | | 15 | 15 | 15 | 15 | 15 | 15 | 15 | 15 | 15 | 15 |
| Pigment | JR806 | | 70 | 70 | 70 | 70 | 70 | 70 | 70 | 70 | 70 | 70 |
| | MICRO ACE S-3 | | 10 | 10 | 10 | 10 | 10 | 10 | 10 | 10 | 10 | 10 |
| | MA-100 | | 1 | 1 | 1 | 1 | 1 | 1 | 1 | 1 | 1 | 1 |
| Polyester | PE-1 | | 55 | | | | | | | | | |
| | PE-2 | | | 55 | | | | | | | | |
| | PE-3 | | | | 55 | | | | | | | |
| | PE-4 | | | | | 55 | | | | | | |
| | PE-5 | | | | | | 55 | | | | | |
| | PE-6 | | | | | | | 55 | | | | |
| | PE-7 | | | | | | | | 55 | | | |
| | PE-8 | | | | | | | | | 55 | | |
| | PE-9 | | | | | | | | | | 60 | |
| | PE-10 | | | | | | | | | | | 55 |
| Curing agent | MF-1 | | 30 | 30 | 30 | 30 | 30 | 30 | 30 | 30 | 25 | 30 |
| | MF-2 | | | | | | | | | | | |
| | BNCO-1 | | | | | | | | | | | |

TABLE 2-continued

|  |  |  |  |  |  |  |  |  |  |  |  |
|---|---|---|---|---|---|---|---|---|---|---|---|
| Thickener | C-1 | 0.5 | 0.5 | 0.5 | 0.5 | 0.5 | 0.5 | 0.5 | 0.5 | 0.5 | 0.5 |
| Solvent | 2-Ethylhexanol | 7 | 7 | 7 | 7 | 7 | 7 | 7 | 7 | 7 | 7 |
|  | 2-Ethylhexyl-glycol |  |  |  |  |  |  |  |  |  |  |
|  | Isododecanol |  |  |  |  |  |  |  |  |  |  |
| Solid content (%) of Coating composition |  | 56 | 57 | 58 | 58 | 59 | 57 | 57 | 57 | 55 | 58 |
| Sag limit thickness μm |  | 38 | 40 | 41 | 41 | 42 | 40 | 39 | 40 | 38 | 40 |
| Finish | LW | 7.5 | 7.2 | 6.8 | 7.4 | 7.2 | 7.9 | 8.1 | 8.2 | 7.2 | 6.9 |
| properties | SW | 11.0 | 10.8 | 11.1 | 11.0 | 11.6 | 11.5 | 11.0 | 11.6 | 10.0 | 10.0 |

|  |  | Example |||||||||| 
|---|---|---|---|---|---|---|---|---|---|---|---|
|  |  | 11 | 12 | 13 | 14 | 15 | 16 | 17 | 18 | 19 | 20 |
| Aqueous coating composition |  | 11 | 12 | 13 | 14 | 15 | 16 | 17 | 18 | 19 | 20 |
| Pigment dispersion paste resin |  | 15 | 15 | 15 | 15 | 15 | 15 | 15 | 15 | 15 | 15 |
| Pigment | JR806 | 70 | 70 | 70 | 70 | 70 | 70 | 70 | 70 | 70 | 70 |
|  | MICRO ACE S-3 | 10 | 10 | 10 | 10 | 10 | 10 | 10 | 10 | 10 | 10 |
|  | MA-100 | 1 | 1 | 1 | 1 | 1 | 1 | 1 | 1 | 1 | 1 |
| Polyester | PE-1 |  |  |  |  |  |  |  |  |  |  |
|  | PE-2 | 55 | 55 | 55 | 55 | 55 | 55 | 55 | 55 | 55 | 55 |
| Curing | MF-1 | 30 | 30 | 30 | 30 | 30 | 30 | 30 | 30 |  | 20 |
| agent | MF-2 |  |  |  |  |  |  |  |  | 30 |  |
|  | BNCO-1 |  |  |  |  |  |  |  |  |  | 10 |
| Thickener | C-1 |  |  |  |  |  |  | 0.5 | 0.5 | 1 | 1 |
|  | C-2 | 0.5 | 1 | 2.8 |  |  |  |  |  |  |  |
|  | C-3 |  |  |  | 0.5 |  |  |  |  |  |  |
|  | C-4 |  |  |  |  | 0.5 |  |  |  |  |  |
|  | C-5 |  |  |  |  |  | 0.5 |  |  |  |  |
| Solvent | 2-Ethylhexanol | 7 | 7 | 7 | 7 | 7 | 7 |  |  |  | 7 |
|  | 2-Ethylhexyl-glycol |  |  |  |  |  |  | 7 |  |  |  |
|  | Isododecanol |  |  |  |  |  |  |  | 7 | 7 |  |
| Solid content (%) of Coating composition |  | 57 | 55 | 53 | 56 | 55 | 56 | 56 | 55 | 55 | 55 |
| Sag limit thickness |  | 39 | 38 | 37 | 38 | 37 | 37 | 37 | 39 | 37 | 39 |
| Finish | LW | 8.2 | 8.4 | 8.9 | 8.2 | 6.6 | 8.9 | 8.6 | 8.2 | 9.3 | 8.9 |
| properties | SW | 11.3 | 11.1 | 10.3 | 11.0 | 11.7 | 11.6 | 11.6 | 10.9 | 10.7 | 10.9 |

|  |  | Comparative Example ||||||||||||||| 
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 |
| Aqueous coating composition |  | 21 | 22 | 23 | 24 | 25 | 26 | 27 | 28 | 29 | 30 | 31 | 32 | 33 | 34 | 35 |
| Pigment dispersion paste resin 1 |  | 15 | 15 | 15 | 15 | 15 | 15 | 15 | 15 | 15 | 15 | 15 | 15 | 15 | 15 | 15 |
| Pigment | JR806 | 70 | 70 | 70 | 70 | 70 | 70 | 70 | 70 | 70 | 70 | 70 | 70 | 70 | 70 | 70 |
|  | Carbon MA-100 | 10 | 10 | 10 | 10 | 10 | 10 | 10 | 10 | 10 | 10 | 10 | 10 | 10 | 10 | 10 |
|  | MICRO ACE S-3 | 1 | 1 | 1 | 1 | 1 | 1 | 1 | 1 | 1 | 1 | 1 | 1 | 1 | 1 | 1 |
| Polyester | PE-1 |  |  |  |  |  |  |  |  |  |  |  |  |  |  |  |
| Resin | PE-2 |  |  |  |  |  |  |  | 55 | 55 | 55 | 55 | 55 | 55 | 55 | 55 |
|  | PE-11 | 55 |  |  |  |  |  |  |  |  |  |  |  |  |  |  |
|  | PE-12 |  | 55 |  |  |  |  |  |  |  |  |  |  |  |  |  |
|  | PE-13 |  |  | 55 |  |  |  |  |  |  |  |  |  |  |  |  |
|  | PE-14 |  |  |  | 55 |  |  |  |  |  |  |  |  |  |  |  |
|  | PE-15 |  |  |  |  | 55 |  |  |  |  |  |  |  |  |  |  |
|  | PE-16 |  |  |  |  |  | 55 |  |  |  |  |  |  |  |  |  |
| Curing | MF-1 | 30 | 30 | 30 | 30 | 30 | 30 | 30 | 30 | 30 | 30 | 30 | 30 | 30 | 30 | 30 |
| agent | MF-2 |  |  |  |  |  |  |  |  |  |  |  |  |  |  |  |
|  | BNCO-1 |  |  |  |  |  |  |  |  |  |  |  |  |  |  |  |
| Thickener | C-1 | 0.5 | 0.5 | 0.5 | 0.5 | 0.5 | 0.5 |  |  |  |  |  |  | 0.5 | 0.5 |  |
|  | C-6 |  |  |  |  |  |  |  |  | 0.5 | 1.5 | 2.5 |  |  |  |  |
|  | C-7 |  |  |  |  |  |  |  |  |  |  |  | 0.5 |  |  |  |
|  | C-8 |  |  |  |  |  |  |  |  |  |  |  |  | 0.5 |  | 0.5 |
| Solvent | 2-Ethylhexanol | 7 | 7 | 7 | 7 | 7 | 7 |  | 7 | 7 | 7 | 7 | 7 | 22 |  |  |
|  | 2-Ethylhexyl-glycol |  |  |  |  |  |  |  |  |  |  |  |  |  |  |  |
|  | Isododecanol |  |  |  |  |  |  |  |  |  |  |  |  |  |  |  |
| Solid content (%) of coating composition |  | 54 | 53 | 52 | 54 | 53 | 54 | 57 | 57 | 56 | 54 | 56 | 52 | 48 | 55 | 54 |
| Sag limit thickness |  | 34 | 33 | 29 | 31 | 30 | 33 | 32 | 35 | 36 | 35 | 32 | 36 | 29 | 34 | 37 |
| Finish | LW | 10.7 | 10.6 | 14.7 | 10.2 | 11.2 | 10.6 | 15.2 | 12.2 | 11.8 | 11.2 | 13.1 | 15.3 | 15.5 | 12.1 | 13.8 |
| properties | SW | 12.8 | 14.2 | 14.3 | 13.2 | 15.2 | 13.6 | 15.6 | 16.2 | 15.9 | 15.1 | 15.2 | 16.8 | 15.2 | 16.1 | 16.9 |

Production of Aqueous First Colored Coating Composition (X)

Production Example 26

1 part of Carbon MA100 (carbon black, Mitsubishi Chemical Corp.), 70 parts of JR806 (titanium white, produced by TAYCA CORP.), and 10 parts of MICRO ACE S-3 (fine talc, Nippon Talc Co. Ltd.) were sequentially added to 37.5 parts of the pigment dispersion paste resin obtained in Production Example 25. The mixture was shaken using a paint shaker for 30 minutes to disperse the materials, thereby obtaining a pigment dispersion paste.

112.5 parts (solid content of 54 parts) of polyester resin (PE-1, solid content=48%) obtained in Production Example 1, 31 parts of a curing agent (B-1) (Bayhydur VP LS-2319, product of Sumitomo Bayer Urethane Co. Ltd., water dispersible polyisocyanate, NCO %=18.0%, solid content=100%), 0.5 parts of a thickener (C-1) and 10 parts of 2-ethylhexanol were sequentially added to 118.5 parts of the obtained pigment dispersion paste under stirring. Further, deionized water and dimethylethanol amine were added to the mixture, and the resulting mixture was adjusted to have pH 8.5 and a viscosity of 40 seconds at and 20° C. in a No. 4 Ford Cup, thereby obtaining Aqueous First Colored Coating Composition (X-1).

Production Examples 27 to 68

Aqueous first colored coating compositions (X-2) to (X-43) were produced from the materials at the proportions specified in Table 3, and the produced compositions were mixed and stirred in the same manner as in Example 26. In Table 3, the proportions other than that for hydrophobic solvent (D) are based on solid content.

The following are the details of the curing agents in Table 3.

Curing agent (B-1): (Bayhydur VP LS-2310, product of Sumitomo Bayer Urethane Co. Ltd., water dispersible polyisocyanate, NCO %=18.0%, solid content=100%)

Curing agent (B-2): Load coat EZM-502 (product of Rhodia Japan, water dispersible polyisocyanate, NCO %=18.5% solid content=100%)

Curing agent (B-3): (Bayhydur XP2570, product of Sumitomo Bayer Urethane Co. Ltd., water dispersible polyisocyanate, NCO %=20.6%, solid content=100%)

Curing agent (B-4): Epocros WS-500 (product of Nippon Shokubai Co. LTD. oxazoline-group-containing compound, solid content=40%, oxazoline group content=4.5 mmol/g resin solid content)

Curing agent (B-5): Carbodilite V-02 (product of Nisshinbo Industries, Inc., carbodiimide group-containing compound, and solid content=40%, carbodiimide group content 1.7 mmol/g resin solid content).

Curing agent (B-6): adipic acid dihydrazide (water soluble product, solid content=10%, hydrazide group content=11.48 mmol/g resin solid content)

Curing agent (B-7): SX-601 (product of Asahi Chemical Industry Co. Ltd., semicarbazide-group containing compound, solid content=45%, semicarbazide group content=4.8 mmol/g resin solid content)

Curing agent (B-8): methyl-butyl-mixed etherified iminogroup-containing melamine resin (weight-average molecular weight=1000, solid content=60%, mole ratio of butoxy groups to methoxy groups: butoxy/methoxy=30/70, bulk solvent; n-butanol)

Curing agent (B-9): (Bayhydur VP LS-2310, product of Sumitomo Bayer Urethane Co. Ltd., water dispersible blocked polyisocyanate, NCO %=9.9%, solid content=38%)

TABLE 3

| | | Production Example | | | | | | | | | | | | | | | |
|---|---|---|---|---|---|---|---|---|---|---|---|---|---|---|---|---|---|
| | | 26 | 27 | 28 | 29 | 30 | 31 | 32 | 33 | 34 | 35 | 36 | 37 | 38 | 39 | 40 | 41 |
| Aqueous first color coating composition | | 1 | 2 | 3 | 4 | 5 | 6 | 7 | 8 | 9 | 10 | 11 | 12 | 13 | 14 | 15 | 16 |
| Pigment dispersion paste resin | | 15 | 15 | 15 | 15 | 15 | 15 | 15 | 15 | 15 | 15 | 15 | 15 | 15 | 15 | 15 | 15 |
| Pigment | JR806 | 70 | 70 | 70 | 70 | 70 | 70 | 70 | 70 | 70 | 70 | 70 | 70 | 70 | 70 | 70 | 70 |
| | Carbon MA-100 | 1 | 1 | 1 | 1 | 1 | 1 | 1 | 1 | 1 | 1 | 1 | 1 | 1 | 1 | 1 | 1 |
| | MICRO ACE S-3 | 10 | 10 | 10 | 10 | 10 | 10 | 10 | 10 | 10 | 10 | 10 | 10 | 10 | 10 | 10 | 10 |
| Polyester Resin | PE-1 | 54 | | | | | | | | | | | | | | | |
| | PE-2 | | 54 | | | | | | | | | 54 | 54 | 54 | 54 | 54 | 54 |
| | PE-3 | | | 54 | | | | | | | | | | | | | |
| | PE-4 | | | | 54 | | | | | | | | | | | | |
| | PE-5 | | | | | 53 | | | | | | | | | | | |
| | PE-6 | | | | | | 54 | | | | | | | | | | |
| | PE-7 | | | | | | | 54 | | | | | | | | | |
| | PE-8 | | | | | | | | 49 | | | | | | | | |
| | PE-9 | | | | | | | | | 57 | | | | | | | |
| | PE-10 | | | | | | | | | | 54 | | | | | | |
| Curing agent | B-1 | 31 | 31 | 31 | 31 | 32 | 31 | 31 | 36 | 28 | 31 | 31 | 31 | 31 | 31 | 31 | 31 |
| Thickener | C-1 | 0.5 | 0.5 | 0.5 | 0.5 | 0.5 | 0.5 | 0.5 | 0.5 | 0.5 | 0.5 | | | | | | |
| | C-2 | | | | | | | | | | | 0.5 | 1 | 2.8 | | | |
| | C-3 | | | | | | | | | | | | | | 0.5 | | |
| | C-4 | | | | | | | | | | | | | | | 0.5 | |
| | C-5 | | | | | | | | | | | | | | | | 0.5 |
| Solvent | 2-Ethylhexanol | 10 | 10 | 10 | 10 | 10 | 10 | 10 | 10 | 10 | 10 | 10 | 6 | 4 | 10 | 10 | 10 |
| | 2-Ethylhexyl-glycol | | | | | | | | | | | | | | | | |
| | Isotridecanol | | | | | | | | | | | | | | | | |

TABLE 3-continued

| | | | | | | | | | | | | | | | | |
|---|---|---|---|---|---|---|---|---|---|---|---|---|---|---|---|---|
| Solid content (%) of Coating composition | | 54 | 55 | 56 | 56 | 57 | 55 | 55 | 55 | 53 | 56 | 55 | 53 | 51 | 54 | 53 | 54 |

| | | Production Example | | | | | | | | | | | |
|---|---|---|---|---|---|---|---|---|---|---|---|---|---|
| | | 42 | 43 | 44 | 45 | 46 | 47 | 48 | 49 | 50 | 51 | 52 | 53 |
| Aqueous first color coating composition | | 17 | 18 | 19 | 20 | 21 | 22 | 23 | 24 | 25 | 26 | 27 | 28 |
| Pigment dispersion paste resin | | 15 | 15 | 15 | 15 | 15 | 15 | 15 | 15 | 15 | 15 | 15 | 15 |
| Pigment | JR806 | 70 | 70 | 70 | 70 | 70 | 70 | 70 | 70 | 70 | 70 | 70 | 70 |
| | Carbon MA-100 | 1 | 1 | 1 | 1 | 1 | 1 | 1 | 1 | 1 | 1 | 1 | 1 |
| | MICRO ACE S-3 | 10 | 10 | 10 | 10 | 10 | 10 | 10 | 10 | 10 | 10 | 10 | 10 |
| Polyester Resin | PE-1 | | | | | | | | | | | | |
| | PE-2 | 54 | 54 | 55 | 57 | 57 | 50 | 59 | 57 | 55 | 59 | 55 | 55 |
| Curing agent | B-1 | 31 | 31 | | | 23 | 20 | 23 | 23 | 10 | | | |
| | B-2 | | | 30 | | | | | | | | | |
| | B-3 | | | | 28 | | | | | | | | |
| | B-4 | | | | | 5.2 | | | | | | | |
| | B-5 | | | | | | 15 | | | | 11 | | |
| | B-6 | | | | | | | 2.5 | | | | | |
| | B-7 | | | | | | | | 5.8 | | | | |
| | B-8 | | | | | | | | | 20 | 15 | 30 | 15 |
| | B-9 | | | | | | | | | | | | 15 |
| Thickener | C-1 | 0.5 | 0.5 | 0.5 | 0.5 | 0.5 | 0.5 | 0.5 | 0.5 | 0.5 | 0.5 | 0.5 | 0.5 |
| Solvent | 2-Ethylhexanol | | | 10 | 10 | 10 | 10 | 10 | 10 | 10 | 10 | 10 | 10 |
| | 2-Ethylhexyl-glycol | 10 | | | | | | | | | | | |
| | Isotridecanol | | 10 | | | | | | | | | | |
| Solid content (%) of coating composition | | 54 | 53 | 54 | 55 | 53 | 52 | 53 | 53 | 52 | 53 | 51 | 50 |

| | | Production Example | | | | | | | | | | | | | |
|---|---|---|---|---|---|---|---|---|---|---|---|---|---|---|---|
| | | 54 | 55 | 56 | 57 | 58 | 59 | 60 | 61 | 62 | 63 | 64 | 65 | 66 | 67 | 68 |
| Aqueous first color coating composition | | 29 | 30 | 31 | 32 | 33 | 34 | 35 | 36 | 37 | 38 | 39 | 40 | 41 | 42 | 43 |
| Pigment dispersion paste resin | | 15 | 15 | 15 | 15 | 15 | 15 | 15 | 15 | 15 | 15 | 15 | 15 | 15 | 15 | 15 |
| Pigment | JR806 | 70 | 70 | 70 | 70 | 70 | 70 | 70 | 70 | 70 | 70 | 70 | 70 | 70 | 70 | 70 |
| | Carbon MA-100 | 1 | 1 | 1 | 1 | 1 | 1 | 1 | 1 | 1 | 1 | 1 | 1 | 1 | 1 | 1 |
| | MICRO ACE S-3 | 10 | 10 | 10 | 10 | 10 | 10 | 10 | 10 | 10 | 10 | 10 | 10 | 10 | 10 | 10 |
| Polyester Resin | PE-1 | | | | | | | | | | | | | | | |
| | PE-2 | | | | | | | 54 | 54 | 54 | 54 | 54 | 54 | 54 | 54 | 54 |
| | PE-11 | 54 | | | | | | | | | | | | | | |
| | PE-12 | | 54 | | | | | | | | | | | | | |
| | PE-13 | | | 54 | | | | | | | | | | | | |
| | PE-14 | | | | 54 | | | | | | | | | | | |
| | PE-15 | | | | | 54 | | | | | | | | | | |
| | PE-16 | | | | | | 54 | | | | | | | | | |
| Curing agent | B-1 | 31 | 31 | 31 | 31 | 31 | 31 | 31 | 31 | 31 | 31 | 31 | 31 | 31 | 31 | 31 |
| Thickener | C-1 | 0.5 | 0.5 | 0.5 | 0.5 | 0.5 | 0.5 | | | | | | 0.5 | 0.5 | | |
| | C-6 | | | | | | | 0.5 | 1.5 | 2.5 | | | | | | |
| | C-7 | | | | | | | | | | 0.5 | | | | | |
| | C-8 | | | | | | | | | | | 0.5 | | | | 0.5 |
| Solvent | 2-Ethylhexanol | 10 | 10 | 10 | 10 | 10 | 10 | | 10 | 10 | 10 | 10 | 10 | 22 | | |
| | 2-Ethylhexyl-glycol | | | | | | | | | | | | | | | |
| Solid content (%) of coating composition | | 52 | 51 | 50 | 52 | 51 | 52 | 55 | 55 | 54 | 52 | 54 | 50 | 46 | 53 | 52 |

- Formation of the Multilayer Coating Film

For each aqueous colored coating compositions (X-1) to (X-43) obtained in the Production Examples 26-68, a test plate was produced as follows, and an evaluation test was performed for each test plate.

- Production of Test Substrates

ELECRON GT-10 (product of Kansai Paint Co. Ltd. cationic electrodeposition paint) was electrodeposited on a cold-rolled sheet steel processed by Palbond #3020 (Nihon Parkerizing Co. Ltd., zinc phosphate treatment agent) so that the layer had a thickness of 20 μm after curing. The layer was cured at 170° C. for 30 minutes to be used as a test substrate.

Example 21

The gel fraction of the aqueous first colored coating composition (X-1) obtained in the Production Example 26 after preheating at 80° C. for 10 minutes was measured as follows.

The aqueous first colored coating composition (X-1) was applied to a polypropylene plate for use in gel fraction measurement, so that the layer had a thickness of 30 μm. After preheating for 10 minutes at 80° C., the gel fraction of the first color coating film was measured according to the above-mentioned method.

At a temperature of 23° C. and a humidity of 67%, the aqueous first colored coating composition (X-1) obtained in the Production Example 26 was applied to the target test substrate, using a rotary atomization coating device, so that the layer had a thickness of 30 μm after curing.

After allowing it to stand for 5 minutes at room temperature, the layer was preheated at 80° C. for 5 minutes. Then, using a revolution atomization bell-shaped coater, the aqueous second colored coating composition (Y) (WBC-713T#202 (finished color=black, acryl/melamine resin aqueous overcoat color basecoat composition, product of Kansai Paint Co., Ltd.) was applied to the aqueous first colored coating composition film so that the layer had a thickness of 15 μm. The layer was then preheated for 3 minutes at 80° C. Thereafter, a clear-coat composition (Z) (MAGICRON KINO#1210TW, product of Kansai Paint Co., Ltd., acid/epoxy-setting acrylic resin solvent-type top clear-coat), adjusted to have a viscosity of 25 seconds at 20° C. in a No. 4 Ford Cup using Swasol 1000 (product of Cosmo Oil Co. Ltd., petroleum aromatic hydrocarbon solvent), was applied on the aqueous second colored coating composition film so that the layer had a thickness of 40 μm. After allowing it to stand for 7 minutes, the layer was heated for 30 minutes at 140° C. so as to simultaneously cure the aqueous first colored coating composition film and the aqueous second colored coating composition film, thereby obtaining a test plate.

Examples 22-48, Comparative Examples 16-30

The same process as in Example 21 was performed using the aqueous first colored coating compositions (X-2) to (X-43) shown in Table 3 instead of the aqueous first colored coating composition (X-1) obtained in Production Example 26. The gel fraction was measured, and a test plate was produced.

Each test plate obtained in the Production Examples 21 to 48 and Comparative Examples 16 to 30 was evaluated in the following manner. Table 4 shows evaluation results.

• Test Method

The finished quality was measured by Wave Scan (product of BYK).

A Long Wave value (LW) and a Short Wave value (SW) were measured by Wave Scan. The Long Wave value is an index of the amplitude of surface roughness at a wave length of about 1.2-12 mm, which shows the condition of the middle wave portion in the coating surface. A Short Wave value is an index of the amplitude of surface roughness at a wave length of about 0.3-1.2 mm, which shows the condition of the small wave portion in the coating surface. For each Wave Scan value, a greater value denotes a higher surface smoothness.

Water resistance: The test plate was immersed in warm water at 40° C. for 240 hours. After being pulled out of the water, the plate was dried for 12 hours at 20° C. The multilayer coating film on the test plate was cut in a matrix pattern to the substrate of the multilayer coating film, thereby forming 100 2 mm×2 mm grids.

Then, adhesive cellophane tape was applied to the surface, and the tape was peeled off rapidly at 20° C. Then the number of the remaining grids was counted.

⊚: all 100 grids remained, and not even a slight removal of the coating film on the cut end of the grid was not observed.

○: all 100 grids remained, but a small removal of the coating film on the cut end of the grid was observed.

Δ: 90 to 99 grids remained.

x: 89 or less grids remained.

TABLE 4

| | Example | | | | | | | | | | | | | | | |
|---|---|---|---|---|---|---|---|---|---|---|---|---|---|---|---|---|
| | 21 | 22 | 23 | 24 | 25 | 26 | 27 | 28 | 29 | 30 | 31 | 32 | 33 | 34 | 35 | 36 |
| Aqueous first color coating composition | 1 | 2 | 3 | 4 | 5 | 6 | 7 | 8 | 9 | 10 | 11 | 12 | 13 | 14 | 15 | 16 |
| Gelfraction (%) of first color coating film after 10 minutes preheating at 80° C. | 42 | 43 | 42 | 38 | 35 | 39 | 43 | 49 | 35 | 44 | 43 | 42 | 43 | 42 | 41 | 42 |
| Finish properties LW | 8.8 | 7.2 | 7.2 | 7.6 | 6.9 | 7.5 | 8.2 | 8.5 | 8.3 | 7.2 | 7.5 | 8.2 | 9.3 | 8.5 | 7.5 | 9.1 |
| Finish properties SW | 13.6 | 13.5 | 13.8 | 13.5 | 13.6 | 13.5 | 13.6 | 14.5 | 14 | 12.9 | 13.4 | 13.8 | 13.6 | 13.5 | 12.5 | 13.9 |
| Water resistance | ○ | ○ | ⊚ | ⊚ | ⊚ | ⊚ | ○ | ⊚ | ○ | ⊚ | ○ | ○ | ○ | ○ | ○ | ○ |

| | Example | | | | | | | | | | | |
|---|---|---|---|---|---|---|---|---|---|---|---|---|
| | 37 | 38 | 39 | 40 | 41 | 42 | 43 | 44 | 45 | 46 | 47 | 48 |
| Aqueous first color coating composition | 17 | 18 | 19 | 20 | 21 | 22 | 23 | 24 | 25 | 26 | 27 | 28 |
| Gelfraction (%) of first color coating film after 10 minutes preheating at 80° C. | 42 | 43 | 42 | 45 | 34 | 33 | 35 | 33 | 28 | 16 | 3 | 2 |
| Finish properties LW | 9.2 | 9.5 | 7.4 | 7.6 | 8.1 | 8.5 | 7.8 | 8.1 | 8.8 | 9.2 | 9.5 | 9.8 |
| Finish properties SW | 13.9 | 13.5 | 13.3 | 13 | 14.2 | 14.1 | 14.2 | 14.4 | 14.6 | 15.3 | 16.3 | 16.8 |
| Water resistance | ○ | ○ | ○ | ○ | ○ | ○ | ○ | ○ | ○ | ○ | ○ | ○ |

| | Comparative Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Aqueous first color coating composition | 29 | 30 | 31 | 32 | 33 | 34 | 35 | 36 | 37 | 38 | 39 | 40 | 41 | 42 | 43 |

TABLE 4-continued

| | | | | | | | | | | | | | | | |
|---|---|---|---|---|---|---|---|---|---|---|---|---|---|---|---|
| Gelfraction (%) of first color coating film after 10 minutes preheating at 80° C. | 46 | 45 | 45 | 37 | 38 | 38 | 43 | 42 | 42 | 40 | 42 | 42 | 40 | 42 | 42 |
| Finish LW | 12.5 | 12.8 | 15.8 | 12.9 | 13.1 | 12.8 | 16.7 | 14.2 | 13.8 | 13.3 | 15.0 | 16.8 | 15.5 | 12.6 | 15.3 |
| properties SW | 21.2 | 22.8 | 27.8 | 19.8 | 23.1 | 18.3 | 17.2 | 17.5 | 17.2 | 17.7 | 17.4 | 24.3 | 17.2 | 18.2 | 29.6 |
| Water resistance | Δ | Δ | X | Δ | Δ | Δ | ○ | ○ | ○ | ○ | Δ | X | ○ | ○ | ○ |

The invention claimed is:

1. An aqueous coating composition containing a polyester resin (A), a curing agent (B), a thickener (C) and a C6-14 hydrophobic solvent (D),
wherein:
the polyester resin (A) is obtained by reaction of an acid component and an alcohol component;
the polyester resin (A) contains a straight-chain dicarboxylic acid (a-1) having a carbon number of 8 or more and a straight-chain diol (a-2) having a carbon number of 8 or more in an amount of 5 to 30 mass % in total, based on the gross amount of the acid component and the alcohol component used in the reaction;
the polyester resin (A) has a hydroxy group value of 100 to 200 mg KOH/g, and an acid value of 8 to 22 mg KOH/g;
the thickener (C) is a urethane-associated thickener containing a C8-36 hydrophobic group and/or a (meth) acrylate-copolymer-based thickener containing a C8-36 hydrophobic group; and
the aqueous coating composition contains the thickener (C) in an amount of 0.01 to 3 mass %, and the hydrophobic solvent (D) in an amount of 4 to 20 mass %, based on the gross amount of the polyester resin (A) and the curing agent (B).

2. The aqueous coating composition according to claim 1, wherein the urethane-associated thickener containing a C8-36 hydrophobic group is a urethane-associated thickener represented by the following Formula (1),

[Chemical Formula 1]

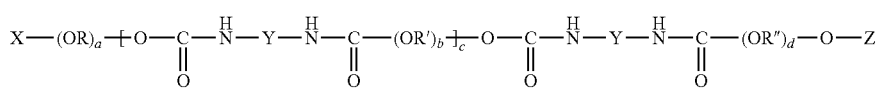

(1)

wherein X and Z, which are the same or different, are C8-36 hydrocarbon groups; Y is a bivalent organic residue derived from a diisocyanate compound; OR, OR' and OR'', which are the same or different, are C2-4 oxyalkylene groups; a and d, which are the same or different, are integers from 0 to 50; b is an integer from 10 to 500; and c is 0 or an integer of not less than 1.

3. The aqueous coating composition according to claim 1, wherein the (meth) acrylate-copolymer-based thickener containing a C8-36 hydrophobic group is obtained by copolymerizing a polymerizable unsaturated monomer mixture containing:

(c-1) (meth) acrylate or salt thereof;
(c-2) polymerizable unsaturated monomer represented by the Formula (2),

[Chemical Formula 2]

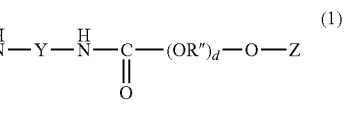

(2)

wherein R1 is a hydrogen atom or a methyl group; $R^2$ and $R^3$, which are the same or different, represent a hydrogen atom, a methyl or ethyl group; R4 is a C8-36 hydrocarbon group; and n is an integer from 3 to 60;

(c-3) alkyl (meth) acrylate having a C1-4 alkyl group; and
(c-4) polymerizable unsaturated monomer having two or more polymerizable unsaturated groups in each molecule, and wherein the mixture contains (c-1) in an amount of 1 to 50 mass %; (c-2) in an amount of 5 to 60 mass %; (c-3) in an amount of 5 to 60 mass %; and (c-4) in an amount of 0.05 to 5 mass %, based on the total amount.

4. The aqueous coating composition according to claim 1 wherein the curing agent (B) contains a melamine resin completely or partially alkyl-etherified, and the mole ratio of the butoxy groups to the methoxy groups in the melamine resin is 20/80 to 50/50.

5. The aqueous coating composition according to claim 2 wherein the curing agent (B) contains a melamine resin completely or partially alkyl-etherified, and the mole ratio of the butoxy groups to the methoxy groups in the melamine resin is 20/80 to 50/50.

6. A method for forming a multilayer coating film comprising sequentially applying an intercoating composition and a top-coating composition to a substrate,
the method comprising the step of applying the aqueous coating composition of claim 1 as an intercoating composition.

7. The method for forming a multilayer coating film according to claim 6, comprising the steps of
(1) applying the intercoating composition (X) on a substrate to form a first colored coating film;
(2) applying a first top coating composition (Y) on the first colored coating film formed in the step (1) to form a second colored coating film;
(3) applying a second top coating composition (Z) on the second colored coating film formed in the step (2) to form a clear film; and
(4) simultaneously drying the first colored coating film, the second colored coating film and the clear coating film formed in the steps (1) to (3) by baking.

8. The method for forming a multilayer coating film according to claim 7, wherein the curing agent (B) contained in the intercoating composition (X) used in the step (1) comprises at least one member selected from the group consisting of isocyanate-group-containing compound (b-1), oxazoline-group-containing compound (b-2), carbodiimide group-containing compound (b-3), hydrazide group-containing compound (b-4) and semicarbazide-group containing compound (b-5).

9. The method for forming a multilayer coating film according to claim 7, wherein the intercoating composition (X) is a coating composition which forms a coating film having a gel fraction of 15 to 95 mass % when the intercoating composition (X) is applied so that the film thickness becomes 30 μm after curing at 80° C. for ten minutes.

10. An article to which the aqueous coating composition of claim 1 is applied.

11. An article having coating layers which are applied using the method for forming a multilayer coating film of claim 6.

\* \* \* \* \*